United States Patent
Osborn et al.

(10) Patent No.: US 12,154,105 B2
(45) Date of Patent: Nov. 26, 2024

(54) SYSTEMS AND METHODS FOR AMPLIFYING THE STRENGTH OF CRYPTOGRAPHIC ALGORITHMS

(71) Applicant: Capital One Services, LLC, McLean, VA (US)

(72) Inventors: Kevin Osborn, Newton, MA (US); Srinivasa Chigurupati, Long Grove, IL (US); William Duane, Westford, MA (US)

(73) Assignee: Capital One Services, LLC, McLean, VA (US)

( * ) Notice: Subject to any disclaimer, the term of this patent is extended or adjusted under 35 U.S.C. 154(b) by 26 days.

(21) Appl. No.: 17/518,387

(22) Filed: Nov. 3, 2021

(65) Prior Publication Data
US 2022/0058642 A1  Feb. 24, 2022

Related U.S. Application Data

(63) Continuation of application No. 16/458,961, filed on Jul. 1, 2019, now Pat. No. 11,210,664, which is a
(Continued)

(51) Int. Cl.
*G06Q 20/00* (2012.01)
*G06Q 20/34* (2012.01)
(Continued)

(52) U.S. Cl.
CPC ....... *G06Q 20/3829* (2013.01); *G06Q 20/352* (2013.01); *H04L 9/085* (2013.01);
(Continued)

(58) Field of Classification Search
None
See application file for complete search history.

(56) References Cited

U.S. PATENT DOCUMENTS 5,835,726 A * 11/1998 Shwed ............... H04L 63/0263
726/13
7,257,229 B1 * 8/2007 Leshem ............... H04L 9/0631
380/37
(Continued)

FOREIGN PATENT DOCUMENTS

CA         2550698 A1    12/2007
CN       101388770 A     3/2009
(Continued)

OTHER PUBLICATIONS

"Chapter 14 Modular Arithmetic With the Multiplicative and Affine Ciphers," downloaded from https://web.archive.org/web/20170421140817/http://inventwithpython.com/hacking/chapter14.html, all pages. (Year: 2017).*
(Continued)

*Primary Examiner* — Radu Andrei
(74) *Attorney, Agent, or Firm* — KDW FIRM PLLC

(57) ABSTRACT

Example embodiments provide systems and methods for increasing the cryptographic strength of an encryption or message-authentication-code-(MAC) generation technique. According to some embodiments, a MAC may be constructed around a shared secret (such as a random initialization number), thereby increasing strength of the MAC against brute force attacks based on the size of the shared secret. The MAC may be combined with randomized data, and may also be encrypted to further bolster the strength of the code. These elements (shared secret, MAC algorithm, and encryption algorithm) may be employed in various combinations and to varying degrees, depending on the application and desired level of security. At each stage, the cryptographic construct operates on the cyptographically modified data from the previous stage. This layering of cryptographic constructs may increase the strength of the
(Continued)

group of contrasts more efficiently than applying any one construct with a larger key size or similar increase in complexity.

20 Claims, 14 Drawing Sheets

Related U.S. Application Data continuation-in-part of application No. 16/205,119, filed on Nov. 29, 2018, now Pat. No. 10,581,611.

(60) Provisional application No. 62/740,352, filed on Oct. 2, 2018.

(51) Int. Cl.
*G06Q 20/38* (2012.01)
*H04L 9/08* (2006.01)
*H04L 9/14* (2006.01)

(52) U.S. Cl.
CPC ............ *H04L 9/14* (2013.01); *G06Q 2220/00* (2013.01); *H04L 2209/56* (2013.01)

(56) References Cited

U.S. PATENT DOCUMENTS

| | | | | |
|---|---|---|---|---|
| 7,805,611 | B1* | 9/2010 | Montemayor | H04L 63/0869 380/255 |
| 2003/0007635 | A1* | 1/2003 | Li | H04L 9/001 380/28 |
| 2003/0086570 | A1* | 5/2003 | Riedel | H04L 9/088 380/277 |
| 2005/0135607 | A1* | 6/2005 | Lee | H04L 9/0631 380/28 |
| 2006/0259790 | A1 | 11/2006 | Asokan et al. | |
| 2008/0288771 | A1* | 11/2008 | Kulakowski | H04L 9/16 713/150 |
| 2010/0313021 | A1* | 12/2010 | Xu | H04L 9/0827 713/168 |
| 2011/0193677 | A1* | 8/2011 | Ho | H04L 67/12 340/3.1 |
| 2011/0317837 | A1* | 12/2011 | Smith | H04L 9/0891 380/259 |
| 2012/0072722 | A1* | 3/2012 | Adams | H04L 63/0428 713/160 |
| 2012/0079571 | A1* | 3/2012 | Evan | H04L 9/3226 726/6 |
| 2013/0268762 | A1* | 10/2013 | Armatis | H04L 63/045 713/171 |
| 2014/0229737 | A1* | 8/2014 | Roth | H04L 9/0618 713/176 |
| 2015/0074390 | A1* | 3/2015 | Stoback | H04L 63/1483 713/156 |
| 2015/0281216 | A1 | 10/2015 | Donohue | |
| 2015/0288667 | A1 | 10/2015 | Alder | |
| 2015/0331619 | A1* | 11/2015 | Zheng | G06F 16/2255 711/154 |
| 2016/0044021 | A1* | 2/2016 | Thibadeau, Sr. | H04L 9/3242 713/159 |
| 2016/0156464 | A1 | 6/2016 | Naslund et al. | |
| 2017/0061396 | A1* | 3/2017 | Melika | G06Q 20/3829 |
| 2018/0123792 | A1* | 5/2018 | Tu | H04L 9/0618 |
| 2018/0302217 | A1* | 10/2018 | Hevia Angulo | H04L 9/085 |
| 2019/0074962 | A1* | 3/2019 | Ateniese | H04L 9/0643 |
| 2019/0296907 | A1* | 9/2019 | Versteeg | H04L 9/50 |

FOREIGN PATENT DOCUMENTS

| | | | |
|---|---|---|---|
| CN | 103081395 A | 5/2013 | |
| CN | 103795533 A | 5/2014 | |
| CN | 106209352 A | 12/2016 | |
| WO | WO-9700471 A2 * | 1/1997 | ............ H04L 29/06 |

OTHER PUBLICATIONS

"Multiplicative Cipher," downloaded from https://web.archive.org/web/20200817012759/https://www.tutorialspoint.com/cryptography_with_python/cryptography_with_python_multiplicative_cipher.htm, all pages. (Year: 2020).*
Christensen, "Multiplicative Ciphers," downloaded from https://web.archive.org/web/20170329084623/https://www.nku.edu/~christensen/section%206%20multiplicative%20ciphers.pdf, all pages. (Year: 2017).*
Encyclopedia of Cryptography and Security. Springer, Boston, MA. https://doi.org/10.1007/0-387-23483-7_147, pp. 169-212 (Year: 2005).*
Anonymous, "Key size," Wikipedia, downloaded from https://en.wikipedia.org/wiki/Key_size on Mar. 12, 2024, all pages.*
Anonymous, "Brute-force attack," Wikipedia, downloaded from https://en.wikipedia.org/wiki/Brute-force_attack on Mar. 12, 2024, all pages.*
NIST glossary entry for "nonce," downloaded from https://csrc.nist.gov/glossary/term/nonce on Mar. 12, 2024, all pages.*
Breekel; EMV In A Nutshell; KPMG; 37 pages; 2016.*
Christensen; Multiplicative Cyphers; MA/CSC 483; 20 pages; 2006.*
CSRC Glossary; Nonce; NISTIR 8202; 3 pages.*
EMV_Card_Personalization_Spec; KPMG; 81 pages; 2003.*
EMV_Issuer_Security_Guidelines; EMVCo, LLC; 82 pages; 2014.*
EMV_Security_and_Key_Management; KPMG; 174 pages; 2011.*
Fontaine; Exhaustive_Key_Search; Anonymous; 44 pages 2002.*
Fontaine; Exhaustive_Key_Search; Tamilnadu, India; 5 PAGES; 2013.*
Wayback M; Cyphers with Pythons; Way Back Machine; 1 page; 2013.*
Wikipedia; Brute-Force-Attack; Wikipedia; 6 pges.*
Wikipedia; Key_Size; Key Size; Wikipedia; 7 pages.*
WO_9700471_A2_I; 69 pages; 1997.*
WO_2010010430_A2_I; 145 pages; 2010.*
Yan; Cryptographic_randomness_on_a_CC2538; IEEE; 6 pages; 2016.*
Chen, Z. "Key Architecture and Updating Protocols in large-scale Card-based access control systems", Aug. 1, 2012 https://pure.tue.nl/ws/portalfiles/portal/47045828/738939-1.pdf.

* cited by examiner

INTERFACE 200

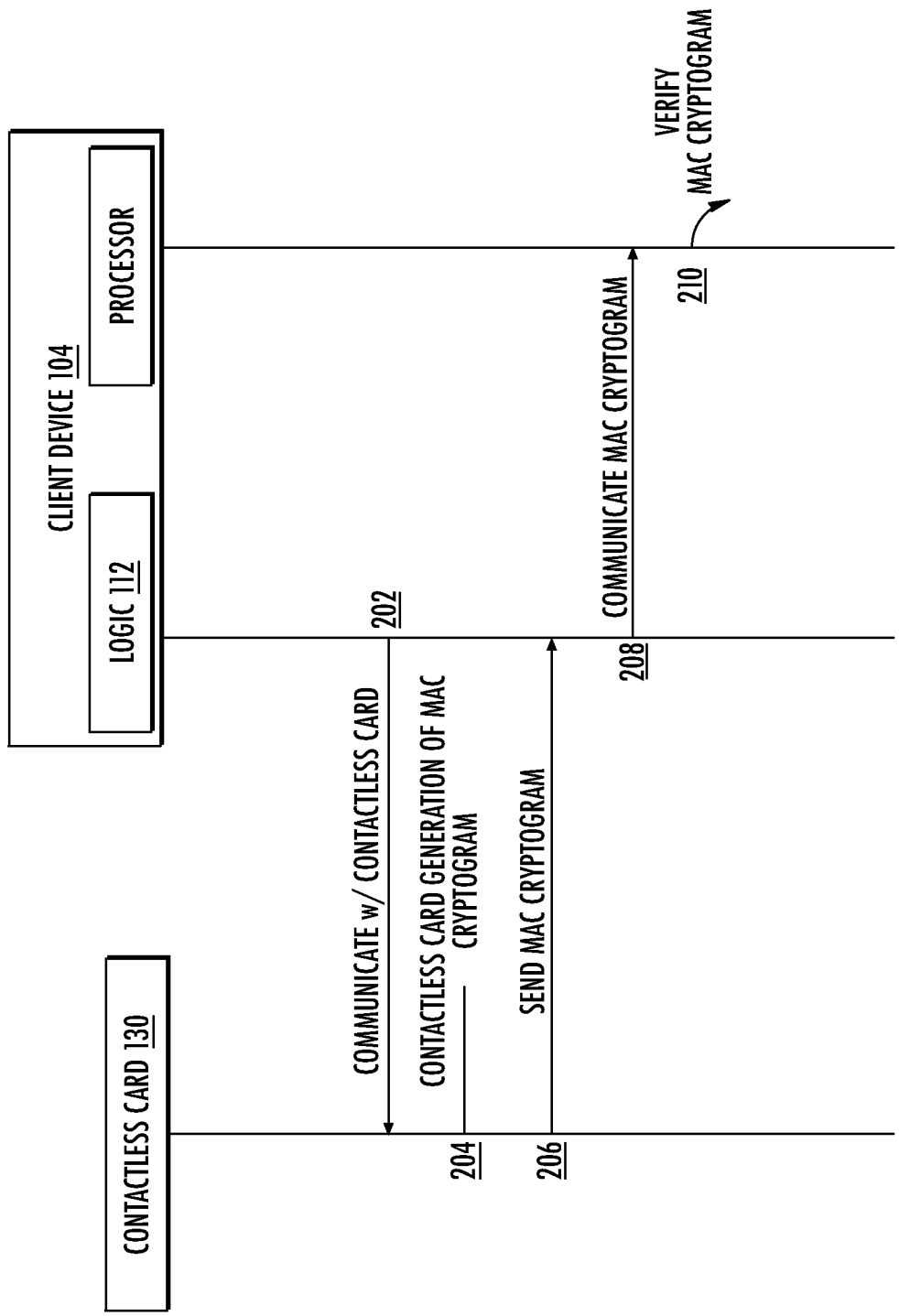

SYSTEMS AND METHODS FOR AMPLIFYING THE STRENGTH OF CRYPTOGRAPHIC ALGORITHMS

CROSS-REFERENCE TO RELATED APPLICATIONS

This application is a continuation of U.S. patent application Ser. No. 16/458,961, filed on Jul. 1, 2019, which is a continuation-in-part of U.S. patent application Ser. No. 16/205,119, filed on Nov. 29, 2018 (issued as U.S. Pat. No. 10,581,611 on Mar. 3, 2020), which claims priority from U.S. Provisional Application Ser. No. 62/740,352, filed on Oct. 2, 2018. The contents of both aforementioned patent and patent applications are incorporated herein by reference in their entireties.

FIELD OF THE INVENTION

The present disclosure relates to cryptography, and more particularly, to system and methods for cryptographic authentication of contactless cards.

BACKGROUND

Data security and transaction integrity are of critical importance to businesses and consumers. This need continues to grow as electronic transactions constitute an increasingly large share of commercial activity.

In some cases, it is important to authenticate the sender of a message (i.e., to verify that the message actually came from the user or device identified as the originator of the message). It may also be important to verify that the message has not been tampered with before receipt (i.e., that the information contained in the message remains the same as when it was transmitted).

Conventionally, a message authentication code (MAC) has been used for this purpose. To generate a MAC, a sender uses a shared key in conjunction with a MAC algorithm to calculate a MAC value from the message data. The sender then sends the message and the MAC value to a receiver, who is also in possession of the key. The receiver applies the MAC algorithm with the key to the received message to generate a receiver-side MAC. If the receiver-side MAC matches the MAC sent with the message, the message is authenticated.

However, like any cryptographic technique, MACs are susceptible to attacks (including brute-force attacks). To measure its resistance to attack, a MAC may be associated with a strength, typically expressed in terms of bits. For instance, a 100-bit effective strength indicates that an attacker would need to perform 2100 operations ($1.27 \times 10^{30}$) in order to guess the MAC using brute-force techniques. A 100-bit MAC would be stronger than an 80-bit MAC, for which the attacker would need to perform 280 operations ($1.21 \times 10^{24}$).

Certain constraints relating to the required strength of a MAC or other cryptographic construct may be placed on data so that at least a minimum security level (e.g., 100 bits) is required. These requirements may be a result, for instance, of an organization's security procedures, regulatory requirements, or known security threats.

The strength of a MAC (or any cryptographic construct) is highly dependent on the cryptographic algorithm and cryptographic keys used to construct the MAC. In some cases, the size of the key or the type of algorithm used may be constrained by some element of the cryptographic system (e.g., security logic, processing capacity, memory usage, back-end hardware security modules, etc.).

A problem can therefore arise if a certain level of security (e.g., 100 bits) is required, but due to constraints on the system only a lower level of security (e.g., 60 bits) is readily achievable.

Similar problems arise in other cryptographic fields. For example, a message may be encrypted before being transmitted on a network. The message may be encrypted using a given cryptographic algorithm that relies on a cryptographic key, where the strength of the encryption is dependent upon the size of the key. The cryptographic strength is again measured in terms of bits; for example, the well-known Advanced Encryption Standard-128 (AES-128) uses a key size of 128 bits and is designed to offer 128 bits of cryptographic strength.

It should be noted, however, that the key size does not necessarily directly correlate to the cryptographic strength offered, because the strength also depends on the algorithm being used. For instance, when applying the Triple Data Encryption Algorithm (Triple DES) with a 168-bit key, an attack algorithm requiring 2112 actions is known; thus, Triple DES offers only 112-bits of cryptographic strength despite using a 168-bit key.

Sometimes, improved attacks are developed after an encryption standard is put into practice. As a result, an encryption protocol having a certain high level of security on one day may have a lower level of security the next.

In addition to cryptographic strength, there are several other considerations when selecting an encryption algorithm and key size. Some algorithms run more quickly than others, and in general increasing the key size also increases the amount of time required to encrypt a message. Thus, a system administrator needs to balance the security offered by an algorithm with the particular application (which may require a certain speed or turnaround time).

Thus, problems can result when applying an encryption algorithm, where a certain level of security is required but, due to constraints on the system or data, that level of security may not be available or practical.

BRIEF DESCRIPTION OF THE DRAWINGS

FIG. 2C depicts an example of data exchange between a contactless card and a client device.

DETAILED DESCRIPTION OF EXAMPLE EMBODIMENTS

Figure 1A:
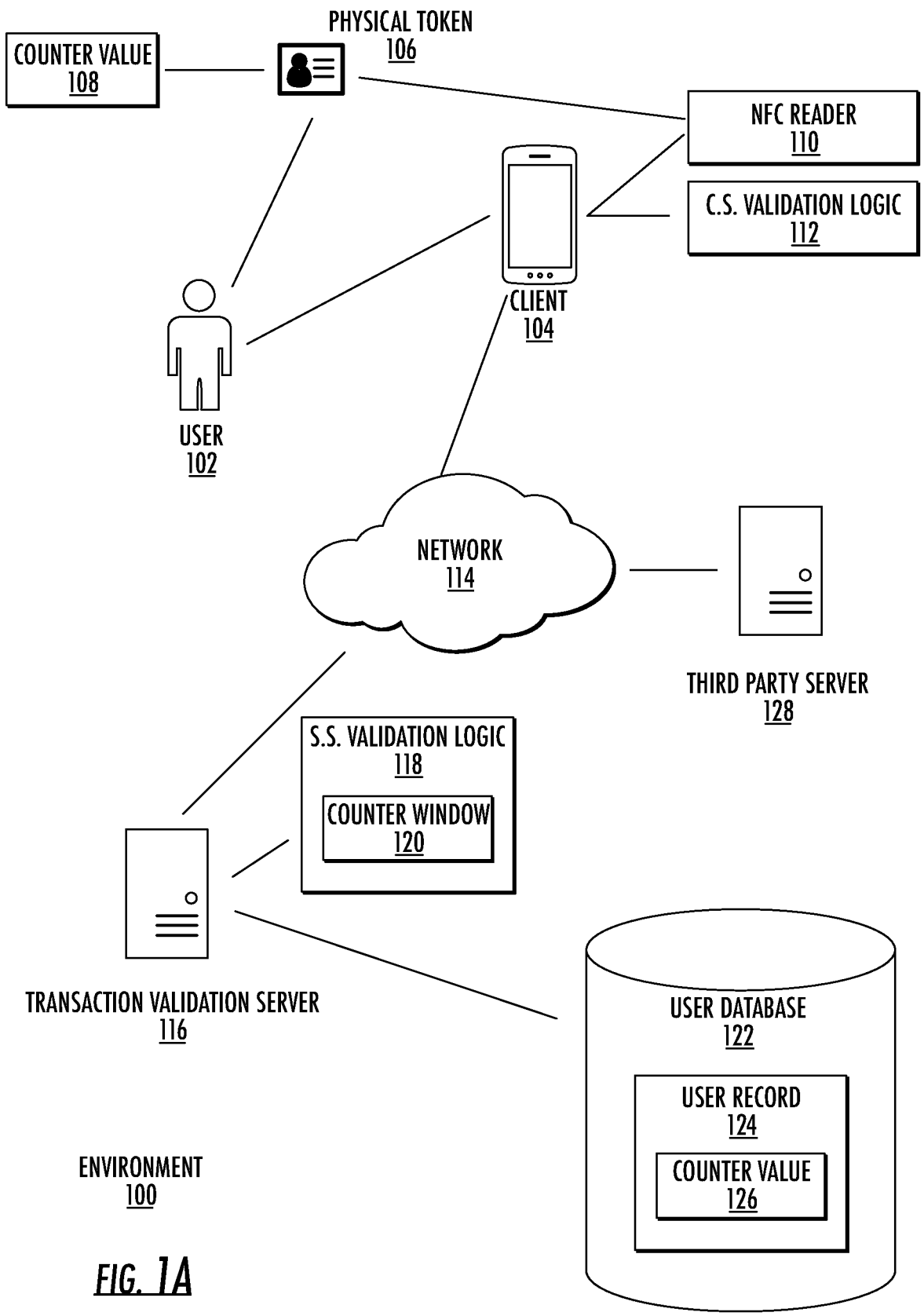
FIG. 1A depicts an environment suitable for use with exemplary embodiments.

Exemplary embodiments provide techniques for constructing a strong cryptographic construct from multiple weak constructs, the combination of a weak construct and a shared secret, or a combination of the constructs and shared secrets. Using the techniques described herein, relatively weak constructs (i.e., constructs each individually offering a cryptographic strength below a security requirement, referred to herein as $S_{security\_requirement}$) may be combined to yield a relatively strong construct (i.e., a construct offering a cryptographic strength above the security requirement).

According to exemplary embodiments, relatively weak cryptographic constructs are layered to amplify their effective bit strength. In one example, a shared secret having an effective bit strength of $S_{shared\_secret}$ may be provided, and a MAC algorithm having an effective bit strength of $S_{MAC\_algorithm}$ may be applied to the shared secret. Although each of $S_{shared\_secret}$ and $S_{MAC\_algorithm}$ may be less than $S_{security\_requirement}$, combining these two elements as described results in an effective bit strength of $S_{shared\_secret}$+$S_{MAC\_algorithm}$.

An important feature of exemplary embodiments is that the cryptographic operations are layered to increase the resulting cryptographic strength, rather than applying such operations side-by-side (which does not result in an increase in cryptographic strength). In other words, a first cryptographic operation is applied to data to generate cryptographically encoded data, and then a second cryptographic operation is applied to the cryptographically encoded data to generate further cryptographically encoded data. For example, a MAC may be applied to data to generate a MAC output, and then the MAC output may be further encrypted to amplify the strength of the combined cryptographic operation. In effect, the layering of the MAC output inside the encryption effectively amplifies the strength of the keys used for the individual cryptographic operations." If you prefer your original wording, then change "generated MAC'ed data" to "generate MAC'ed data This is in contrast to (e.g.,) a system whereby data is encrypted and a MAC is generated from the encrypted data, and then the MAC and encrypted data are both included in a message. Although the encryption and MAC algorithms both use cryptographic keys, the cryptographic operations are applied independently and therefore this sequence does not magnify or amplify the cryptographic key strength.

As an illustrative example of layering to increase the effective key strength, if the shared secret has a length of 32 bits, it would require $2^{32}$ operations to exhaustively search the entire set of possible key values. If the shared secret is then processed by a MAC algorithm having an effective strength of 72 bits, then a potential brute-force attacker would need to: (1) try every value for the 72-bit MAC key, and (2) for each potential value of the MAC key, try each possible configuration of the 32-bit shared secret. Consequently, a brute-force attacker would need to attempt $2^{32}*2^{72}$ possible values, resulting in a requirement for $2^{104}$ operations, or an effective bit strength of 104 bits.

Thus, it can be seen that if $S_{security\_requirement}$ is 100 and a cryptographer only has access to a MAC algorithm having a 72-bit strength and a shared secret of 32 bits, a cryptographic construct that meets the security requirement can be generated by applying the MAC algorithm to the shared secret. In this example, the layering occurs because the shared secret is included inside the MAC operation The strength of the construct can be further amplified by encrypting the resulting MAC. If the encryption algorithm used has an effective bit strength of $S_{encryption\_algorithm}$, then the resulting construct's strength would correspond to $S_{shared\_secret}$+$S_{MAC\_algorithm}$+$S_{encryption\_algorithm}$. This process may be repeated and/or applied in various orderings or combinations to yield a desired effective bit strength.

Multiple such examples are considered within the scope of the present invention. For instance, some contemplated embodiments involve: computing a MAC over a shared secret (alone or with other data); applying a MAC to message content and then encrypting the resulting MAC; applying a first MAC algorithm to message content or a shared secret (alone or with other data) and then applying a second MAC algorithm (the same as or different than the first) to the resulting output; computing a MAC over a shared secret (alone or with other data) and encrypting the result; and encrypting data with a first encryption algorithm/key to yield encrypted data, and then further encrypting the encrypted data using a second encryption algorithm/key. In this latter embodiment, it is contemplated that different encryption algorithms could be combined, or the same encryption algorithm could be applied multiple times. In either case, the cryptographic algorithms should be used with different encryption keys. It is not necessary that the effective bit strengths of the cryptographic constructs to be combined be the same.

As used herein, an encryption algorithm generally refers to an algorithm that accepts an input and encodes the input to generate encrypted content that can be decrypted by an authorized party. A MAC algorithm, on the other hand, is not generally intended to be reversible (i.e., when the MAC algorithm is applied to the input to generate a MAC output, the input typically cannot be reconstructed from the MAC output). Instead, the recipient either needs to be provided with a copy of the input or needs to already be in possession of the input. The recipient can run the same MAC algorithm using the same key on the input as was applied by the sender; if the MAC output generated by the recipient is the same as the MAC output sent by the sender, the recipient knows that the input considered by the sender and the input considered by the recipient were the same (and that the message was not tampered with or corrupted before receipt).

To further increase the security of exemplary embodiments, the keys applied by the MAC and/or encrypted algorithms may be diversified session keys that are computed based on a changing counter value known to the sender and the receiver. In some embodiments, the cryptographic constructs may be used to authenticate messages sent in association with a smart card, such as a credit card. A chip on the card may maintain a counter that increments each time the card is used, and a remote validation server may maintain a similar counter. The counter may be used to compute the MAC/encryption keys. Thus, even if a brute-force attacker is able to reconstruct the key used to generate or protect a particular message, the next message will be constructed with a new key based on the new counter value. Accordingly, the key the attacker was able to break was only good for one use; it cannot be used to attack future communications.

Exemplary embodiments are described below primarily in relation to cryptographic algorithms based on symmetric keys. Nonetheless, it is understood that this solution is not limited to these types of algorithms, and would apply to asymmetric algorithms as well.

As noted above, some embodiments may be used to protect messages transmitted in connection with an authentication message for a smart card having an embedded chip. An exemplary environment in which such an embodiment might be used is next described, before providing more detail on specific aspects of increasing the cryptographic strength of the authentication message.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. The description of embodiments should facilitate understanding of the invention to such an extent that other implementations, not specifically covered but within the knowledge of a person of skill in the art having read the description of embodiments, would be understood to be consistent with an application of the invention.

FIG. 1A illustrates a data transmission environment 100 according to an example embodiment. As further discussed below, system 100 may include contactless card including a physical token 106, a client device 104, a network 114, and a number of servers 116, 128. Although FIG. 1A illustrates a particular configuration of components, one of ordinary skill in the art will understand that other configurations including more or fewer components, or components in another configuration, may be used.

The environment 100 may include one or more contactless cards, which are further explained below with reference to FIG. 1B. In some examples, a contactless card may be in wireless communication, for example NFC communication, with the client device 104. The contactless card may include a physical token 106, such as a contactless chip (see FIG. 1C). The physical token 106 may maintain a copy of the above-noted counter value 108, which may be incremented each time the physical token is read by a reader (such as the NFC reader 110).

The environment 100 may include a client device 104, which may be a network-enabled computer. As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client, a fat client, an Internet browser, or other device. The client device 104 also may be a mobile device; for example, a mobile device may include an iPhone, iPod, iPad from Apple® or any other mobile device running Apple's iOS operating system, any device running Microsoft's Windows® Mobile operating system, and/or any other smart-phone or like wearable mobile device.

The client device 104 and/or the contactless card including the physical token 106 may be associated with a user 102, which may be the owner of the contactless card. The user 102 may define credentials for accessing a mobile application on the client device 104, which may be an application associated with a service provider of the contactless card.

The client device 104 may include a near-field communications reader 110 suitable for communicating with the physical token 106; for example, the NFC reader 100 may be used to read the counter value 108 from the physical token 106.

In various examples according to the present disclosure, the client device 104 of the environment 100 may execute one or more applications, such as software applications. The software applications may enable network communications with one or more components of the environment 100 and may transmit and/or receive data. Among other computer-executable logic, the client device 104 may include client-side validation logic 112 (such as the logic depicted in more detail in connection with FIG. 5).

The client device 104 may be in communication with one or more servers 116, 128 via one or more networks 114, and may operate as a respective front-end to back-end pair with a transaction validation server 116. The client device 104 may transmit, for example from a mobile device application executing on client device 104, one or more requests to the server 116. The one or more requests may be associated with retrieving data from the server 116. The server 116 may receive the one or more requests from client device 104. Based on the one or more requests from the client device 104, the server 116 may be configured to retrieve the requested data from one or more databases (not shown). Based on receipt of the requested data from the one or more databases, the server 116 may be configured to transmit the received data to the client device 104, the received data being responsive to one or more requests.

The environment 100 may include one or more servers 116, 128. In some examples, the servers 116, 128 may include one or more processors, which are coupled to memory. The servers 116, 128 may be configured as a central system, server or platform to control and call various data at different times to execute a plurality of workflow actions. The servers 116, 128 may be configured to connect to the one or more databases. The client device 104 may be connected to at least one of the servers 116, 128.

In one embodiment, a third-party server 128 may request that a transaction be validated. For instance, the third-party server 128 may be a server associated with a vendor selling a product or service, for which a purchase request is submitted in the name of the user 102. The third-party server 128 may request that the purchase be validated with the service provider.

Figure 6A:
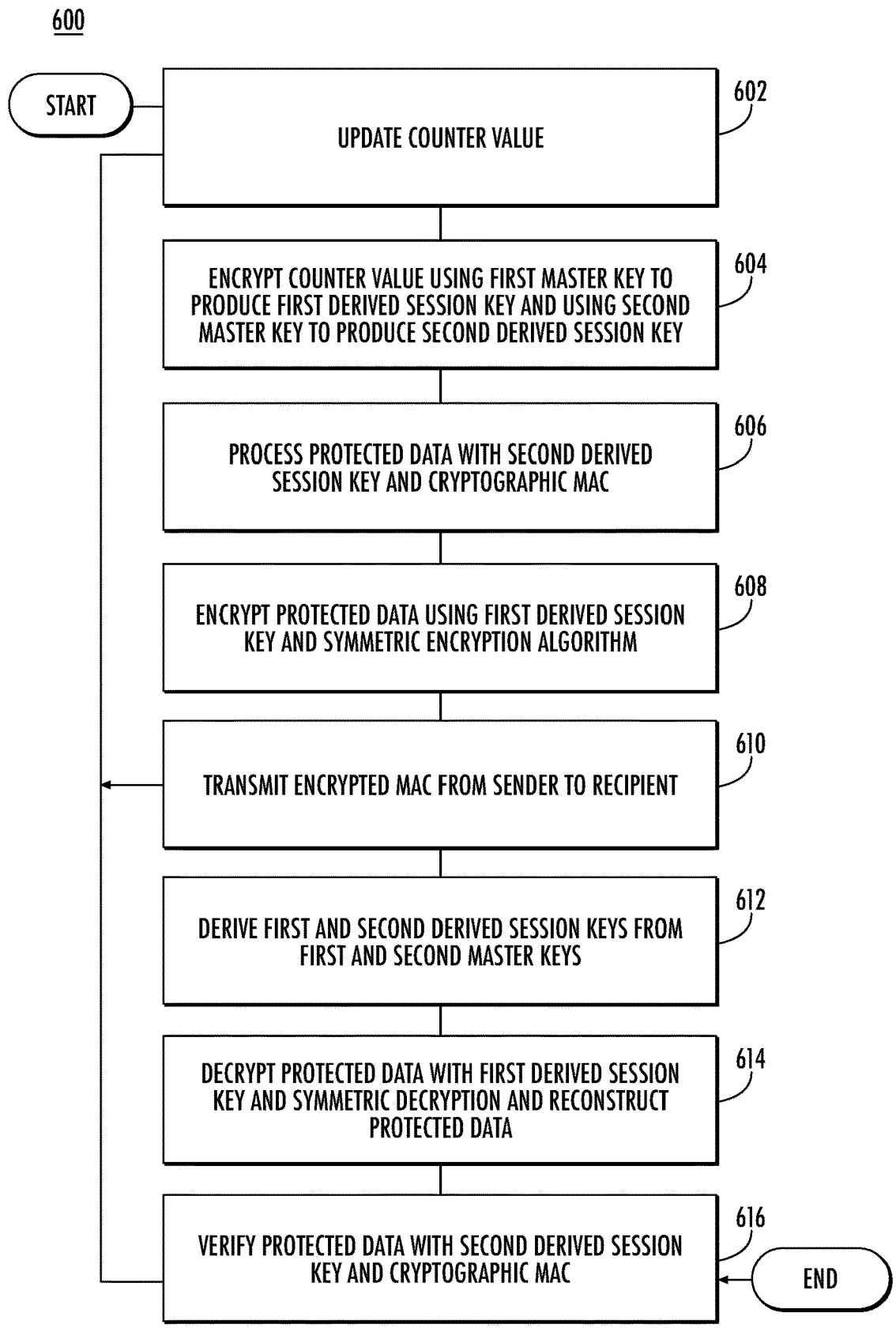
FIG. 6A is a flowchart illustrating a process of key diversification according to an example embodiment.

To that end, the third-party server 128 may communicate, via the network 114, with a transaction validation server 116 affiliated with the service provider. To validate the transaction, the server 116 may execute server-side validation logic 118 (such as the logic depicted in FIG. 6). The logic 118 may maintain a counter window 120 defining a range of acceptable counter values (which, as noted above, account for accidental reads and other unintentional incrementing of the counter value 108). The counter window 120 may include several different ranges associated with different risk levels, such as a relatively wide range for low-risk transactions, and a relatively narrow range (which may require an exact match) for high-risk transactions.

The logic 118 may apply the counter window 120 in conjunction with a counter value 126 stored in a user database 122 and indexed to a record 124 associated with the user 102. For example, the counter window 120 may be added to the stored counter value 126 to derive a maximum acceptable counter value, and the maximum acceptable counter value may be compared to the counter value 108 received from the card. If the card's counter value 108 does not exceed the maximum acceptable counter value, a transaction may be authorized. If the card's counter value 108 does exceed the maximum acceptable counter value, the user may be asked to reauthenticate the card (as described below), which provides the server 116 with a new counter value 108 from the card. Assuming the new counter value 108 from the card is consistent with the counter value 108 previously received at the beginning of the transaction, the server 116 may update its own stored counter value 126 to match the one provided by the card. If not, further authentication steps may be required, or the transaction may be denied.

The user database 122 need not necessarily be a database, but may be any data structure suitable for storing a counter value 126 associated with the physical token 106 of the user 102.

Figure 1B:
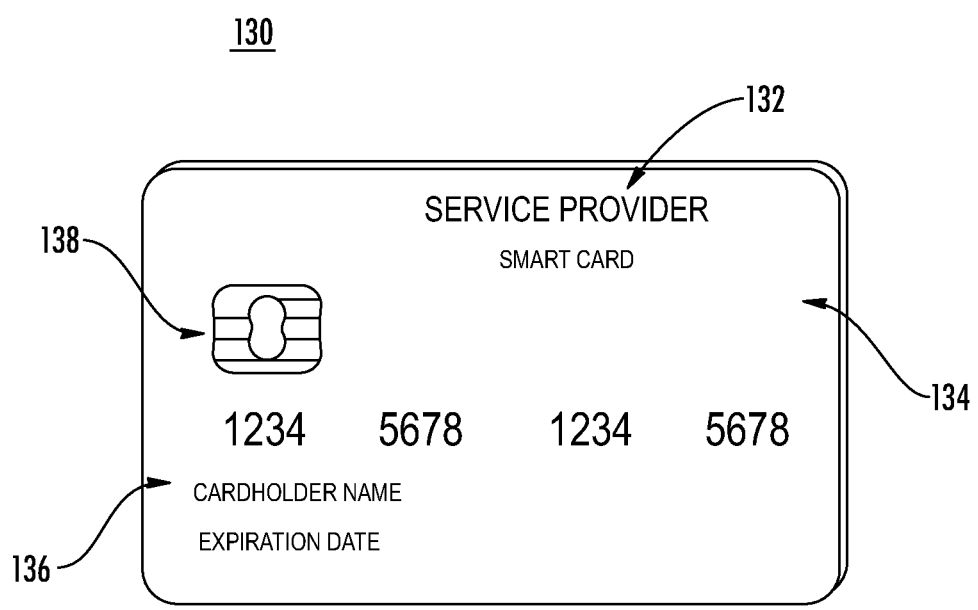
FIG. 1B depicts an example of a contactless card having a physical token.

FIG. 1B illustrates one or more contactless cards 130, which may comprise a payment card, such as a credit card, debit card, or gift card, issued by a service provider 132 displayed on the front or back of the card 130. In some examples, the contactless card 130 is not related to a payment card, and may comprise, without limitation, an identification card. In some examples, the payment card may comprise a dual interface contactless payment card. The contactless card 130 may comprise a substrate 134, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 130 may have physical characteristics compliant with the ID-1 format of the ISO/IEC 7810 standard, and the contactless card may otherwise be compliant with the ISO/IEC 14443 standard. However, it is understood that the contactless card 130 according to the present disclosure may have different characteristics, and the present disclosure does not require a contactless card to be implemented in a payment card.

The contactless card 130 may also include identification information 136 displayed on the front and/or back of the card, and a contact pad 138 representing a physical token. The contact pad 138 may be configured to establish contact with another communication device, such as a user device, smart phone, laptop, desktop, or tablet computer. The contactless card 130 may also include processing circuitry, antenna and other components not shown in FIG. 1C. These components may be located behind the contact pad 138 or elsewhere on the substrate 134. The contactless card 130 may also include a magnetic strip or tape, which may be located on the back of the card (not shown in FIG. 1B).

Figure 1C:
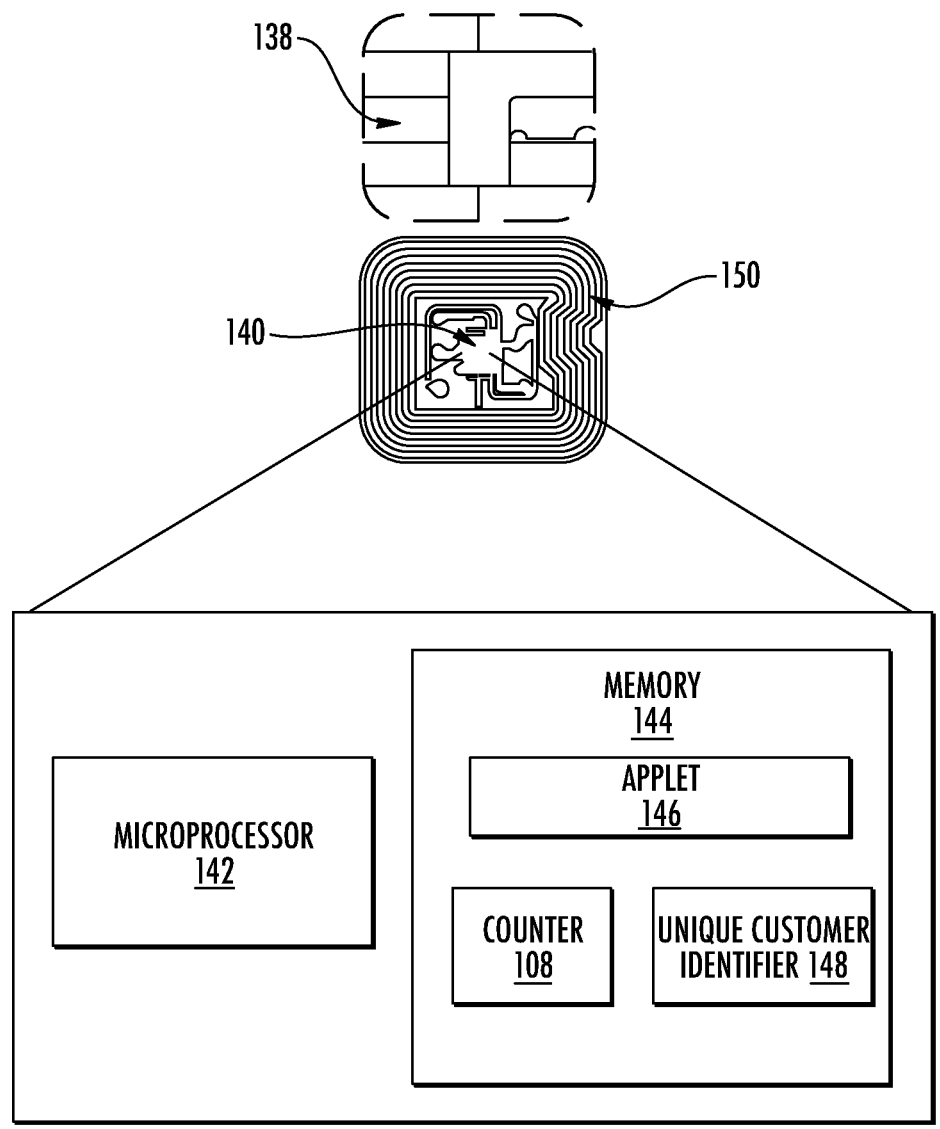
FIG. 1C depicts the structure of an exemplary physical token.

As illustrated in FIG. 1C, the contact pad 138 of FIG. 1B may include processing circuitry 140 for storing and processing information, including a microprocessor 142 and a memory 144. It is understood that the processing circuitry 140 may contain additional components, including processors, memories, error and parity/CRC checkers, data encoders, anticollision algorithms, controllers, command decoders, security primitives and tamperproofing hardware, as necessary to perform the functions described herein.

The memory 144 may be a read-only memory, write-once read-multiple memory or read/write memory, e.g., RAM, ROM, and EEPROM, and the contactless card 500 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 144 may be configured to store one or more applets 146, one or more counters 108, and a customer identifier 148. The one or more applets 146 may comprise one or more software applications configured to execute on one or more contactless cards, such as Java Card applet. However, it is understood that applets 146 are not limited to Java Card applets, and instead may be any software application operable on contactless cards or other devices having limited memory. The one or more counters 108 may comprise a numeric counter sufficient to store an integer. The customer identifier 148 may comprise a unique alphanumeric identifier assigned to a user of the contactless card 130, and the identifier may distinguish the user of the contactless card from other contactless card users. In some examples, the customer identifier 148 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 138 or entirely separate from it, or as further elements in addition to processor 142 and memory 144 elements located within the contact pad 138.

In some examples, the contactless card 130 may comprise one or more antennas 150. The one or more antennas 150 may be placed within the contactless card 130 and around the processing circuitry 140 of the contact pad 138. For example, the one or more antennas 150 may be integral with the processing circuitry 140 and the one or more antennas 150 may be used with an external booster coil. As another example, the one or more antennas 150 may be external to the contact pad 138 and the processing circuitry 142.

In an embodiment, the coil of contactless card 130 may act as the secondary of an air core transformer. The terminal may communicate with the contactless card 130 by cutting power or amplitude modulation. The contactless card 130 may infer the data transmitted from the terminal using the gaps in the contactless card's power connection, which may be functionally maintained through one or more capacitors. The contactless card 130 may communicate back by switching a load on the contactless card's coil or load modulation. Load modulation may be detected in the terminal's coil through interference.

As explained above, the contactless cards 130 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange (NDEF) requests, from a reader, such as a mobile NFC reader, and produce an NDEF message that comprises a cryptographically secure OTP encoded as an NDEF text tag.

Figure 2A:
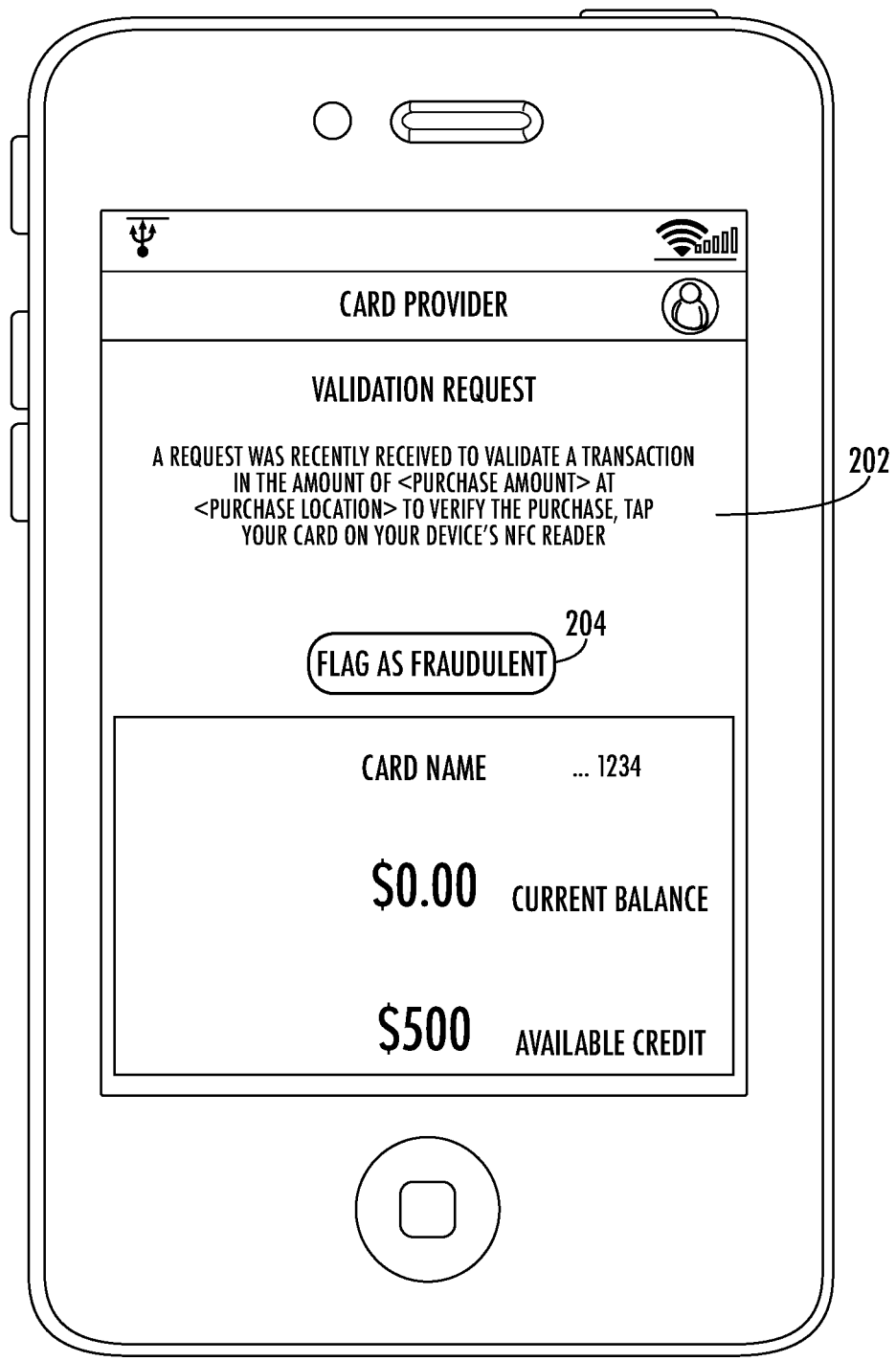
FIG. 2A depicts an exemplary interface for a mobile application associated with an owner of a contactless card.
Figure 2B:
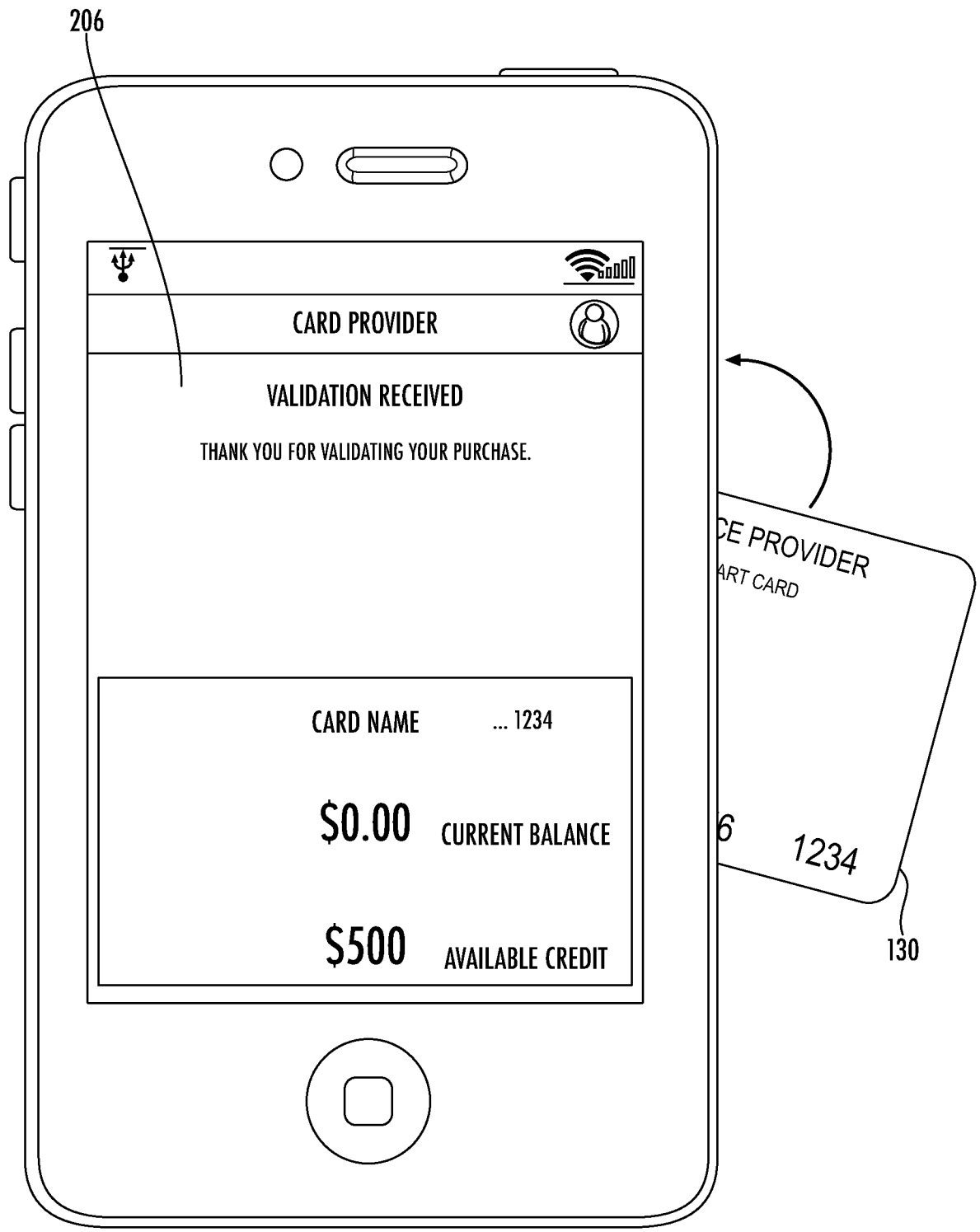
FIG. 2B depicts an exemplary interface when the physical token is read by a reader on the owner's mobile device.

As noted above, exemplary transactions may validate a transaction requested of an account associated with the contactless card via the logic 112 executing on the client device 104. FIGS. 2A-2B depict exemplary interfaces that may be presented on the client device 104 in response to the logic.

Prior to displaying the interfaces, the user of the client 104 may be notified that a transaction requires validation. For instance, the user may receive an SMS message from the service provider, may receive a notification through the service provider's application, may receive a call or an email, etc.

Upon receiving the notification, the user may log into the service provider's application. The user may, for instance, supply a username and password, which may validate the user's identity. In other embodiments, the user may be validated in other ways, such as through biometric data. In some embodiments, login may utilize two-factor authentication (2FA).

When the user logs into the application, they may be presented with an interface, such as the interface 200 depicted in FIG. 2A. In the interface, a message 202 may be displayed indicating that a questionable transaction has been received and requires validation. The message 202 may include details of the transaction, such as the value of the transaction, the name of the vendor attempting to validate the transaction, etc.

The interface 200 may include an interactable element 204 allowing the user to flag the transaction as fraudulent, if the user did not authorize the transaction. Upon selecting the interactable element 204, the application may transmit a fraud alert message to the transaction validation server indicating that the transaction in question is not approved.

The message 202 may also include instructions for validating the transaction, if the user did authorize the transaction. In one embodiment, validating the transaction may involve tapping the card 130 to a reader on the back of the client device 104, as shown in FIG. 2B. The reader may read the counter value from the physical token on the card 130, and may generate a message 300 (see FIG. 2D) including the counter value 304 and an authentication cryptogram 306. The message 300 may be encrypted.

The counter value 304 may correspond to the counter value most recently read from the card, and the authentication cryptogram 306 may be generated based on cryptographic keys stored on the physical token 138 and may be used to authenticate the card with the transaction validation server and ensure that the message 300 has not been tampered with or corrupted.

The message 300 may also include a token identifier 302, which may identify the card 130 and/or the user associated with the card. For instance, the token identifier 302 may correspond to the unique customer identifier 148 stored in the physical token 138).

Upon receiving the message 300, the transaction validation server may decrypt the message 300, validate the card and the message based on the cryptogram 306, match the message to a user account based on the token identifier 302, and retrieve a user record 124 (see FIG. 1A) from the transaction validation server corresponding to the user account. The transaction validation server may then compare the counter value 304 to the corresponding counter value 126 stored in the user database 122 to verify that the number of reads or transactions on the card matches the expected counter value stored on the server. This may validate that the user is in possession of the card (i.e., that the message 300 is not forged) and that the number of transactions performed by the user matches the service provider's expectation. If the counter values are not in sync, this may indicate that unauthorized transactions have been attempted and may result in the present transaction being declined (or may result in additional validation actions being required).

One of ordinary skill in the art will understand that the message 300 is depicted in a simplified format. In some embodiments, other components may be present in the message, or the depicted components may be combined or modified.

FIG. 2C is a timing diagram illustrating an example sequence for providing authenticated access according to one or more embodiments of the present disclosure. A system may include a contactless card 130 and a client device 104, which may include an application (which may include the logic 112) and a processor.

At 202, the application communicates with the contactless card 130 (e.g., after being brought near the contactless card 130). Communication between the application and the contactless card 130 may involve the contactless card 130 being sufficiently close to a card reader (not shown) of the client device 104 to enable NFC data transfer between the application and the contactless card 130.

At step 204, after communication has been established between client device 104 and contactless card 130, the contactless card 130 generates a message authentication code (MAC) cryptogram. In some examples, this may occur when the contactless card 130 is read by an application hosting the logic 112. In particular, this may occur upon a read, such as an NFC read, of a near field data exchange (NDEF) tag, which may be created in accordance with the NFC Data Exchange Format. For example, a reader, such as the logic 112, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 130 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, the logic 112 may be configured to transmit a request to the contactless card 130, the request comprising an instruction to generate a MAC cryptogram.

At step 206, the contactless card 130 sends the MAC cryptogram to the logic 112. In some examples, the transmission of the MAC cryptogram occurs via NFC, however, the present disclosure is not limited thereto. In other examples, this communication may occur via Bluetooth, Wi-Fi, or other means of wireless data communication.

At step 208, the logic 112 communicates the MAC cryptogram to the processor.

At step 210, the processor verifies the MAC cryptogram pursuant to an instruction from the logic 112. For example, the MAC cryptogram may be verified, as explained below.

In some examples, verifying the MAC cryptogram may be performed by a device other than client device 104, such as a server 116 in data communication with the client device

104. For example, the processor may output the MAC cryptogram for transmission to the server 116, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 2D:
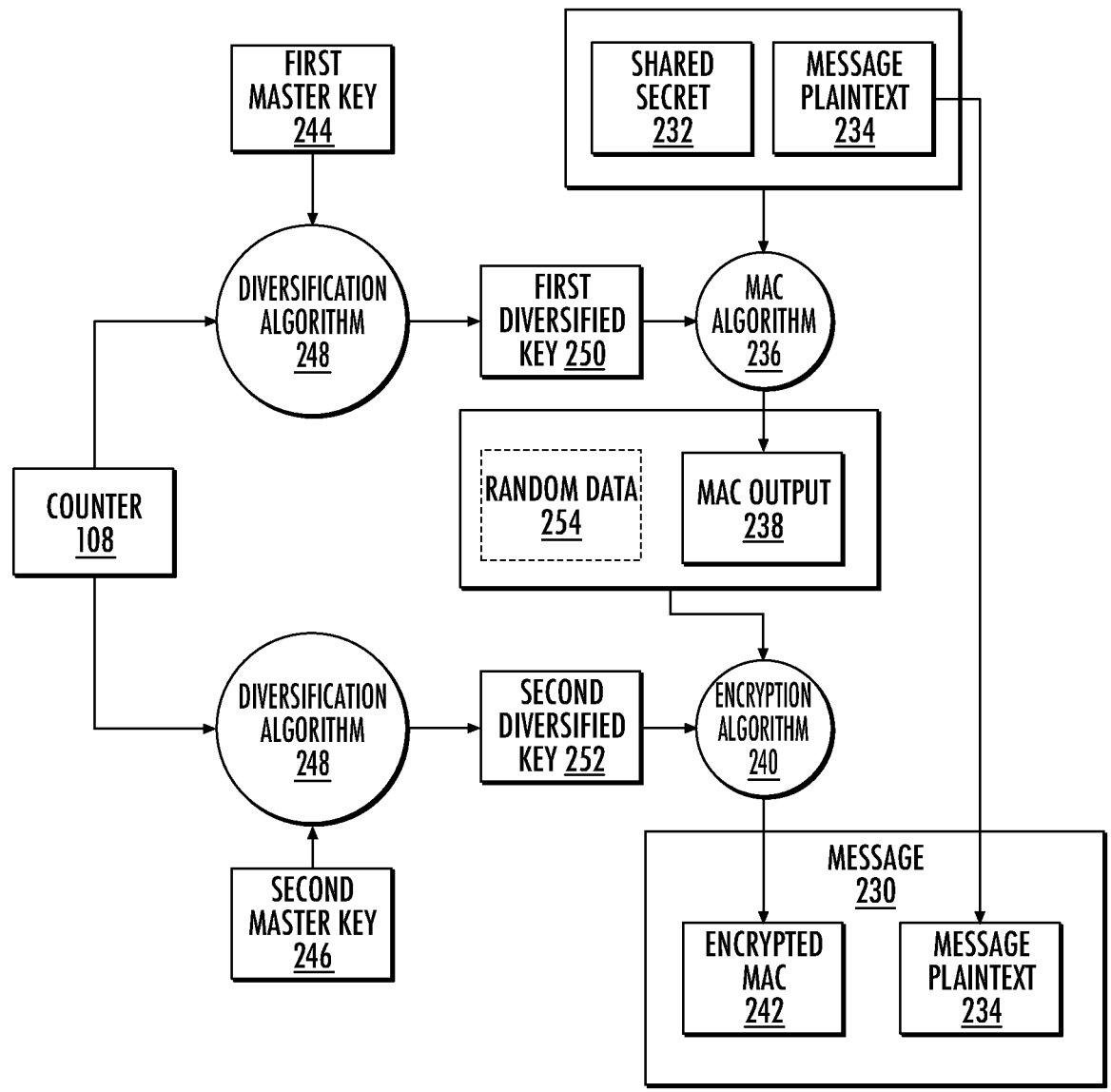
FIG. 2D depicts an exemplary data structure suitable for use with exemplary embodiments.

FIG. 2D depicts an exemplary technique for generating a protected message 230 in accordance with exemplary embodiments.

The message 230 may be configured to deliver information or content from a sender to a recipient. This information or content may be represented by message plaintext 234 (although the content may optionally be encrypted or otherwise protected).

The message plaintext 234 may be combined with a shared secret 232. The shared secret 232 may be a random number known to both the sender and the recipient. For instance, if the message plaintext 234 relates to an authentication action for a contactless card as described above, the process of setting up or initializing the card may involve sharing a random number between the chip on the card and the transaction validation server. In one embodiment, the random number may be a 32-bit random number. Alternatively or in addition, a communication session may be set up by the sender and recipient; the process of setting up the communication session may involve sharing a random number between the sender and recipient, and the random number may be used as the shared secret 232.

The message plaintext 234 and the shared secret 232 may be combined in various ways. In one embodiment, the message plaintext 234 may be encoded in a format so that it can be multiplied by the shared secret 232. The resulting product may then be applied to the MAC algorithm. In another embodiment, the message plaintext 234 may be concatenated, in whole or in part, with the shared secret 232. The resulting combination may then be applied to the MAC algorithm. The resulting MAC may be encrypted before transmission.

When the recipient (e.g. a receiving server) retrieves the MAC data, the recipient may decrypt the data to recover the MAC created by the sender. The recipient may then take the message plaintext 234 and combine it with the agreed-upon shared secret 232 in the same way as was done at the sender. The recipient may generate a MAC based on this combined data and compare it to the MAC transmitted from the sender. If the two match, then the recipient can assume that the message has not been tampered with in transmission.

One of ordinary skill in the art will recognize that other techniques exist for combining two different instances of data, any of which may be suitable for use with exemplary embodiments.

After the message plaintext 234 and the shared secret 232 are combined, they may be provided to a MAC algorithm 236. The MAC algorithm 236 may be any suitable MAC algorithm, such as the data authentication algorithm (DAA), cipher block chaining message authentication codes (CBC-MAC), Galois message authentication code (GMAC), and hashed message authentication code (HMAC), among many others.

The MAC algorithm 236 operates using a key. In exemplary embodiments, this key may be a first diversified key 250 created using a diversification algorithm 248. The diversification algorithm may operate on the counter 108 received from the contactless card and a first master key 244 stored on the contactless card (described in more detail below) to generate the first diversified key 250. Using the first diversified key 250 and the combined shared secret/plaintext, the MAC algorithm 236 may generate MAC output 238.

The MAC output 238 may optionally be encrypted by an encryption algorithm 240 to generate an encrypted MAC 242. The encryption algorithm 240 may be any suitable encryption algorithm, such as data encryption standard (DES), TripleDES (3DES), advanced encryption standard (AES), and RSA, among many others.

In some embodiments, the MAC output 238 may be combined with random data 254. For instance, in one embodiment, the MAC output 238 may be combined with 8 bytes of randomly generated data 254. When the recipient receives the message 300, the recipient may decrypt the encrypted MAC 242 and discard the random data. The recipient may calculate its own version of the MAC, as described below, and may compare the recipient-generated MAC to the data remaining from the encrypted MAC 242 received as part of the message 230.

It should be clear to one practiced in the art that in some embodiments the MAC output 238 may be truncated such that only a portion of the original MAC output is sent by the sender. The recipient will then independently compute the MAC output and similarly truncate it before comparing truncated MAC outputs The encryption algorithm 240 also operates using a key. In exemplary embodiments, this key may be a second diversified key 252 created using the diversification algorithm 248. The diversification algorithm may operate on the counter 108 received from the contactless card and a second master key 246 stored on the contactless card (described in more detail below) to generate the second diversified key 252. Using the second diversified key 252, the random data 254 and the MAC output 238 are encrypted using the encryption algorithm 240 to create the encrypted MAC 242, which is included as a portion of the message 230.

The encrypted MAC 232 may be transmitted along with the message plaintext 234. The counter value 108 may optionally be transmitted as part of the message plaintext 234, and may be consulted by the recipient (e.g., the server) in authenticating the message. The shared secret 232 is not directly sent as part of the message.

Figure 3:
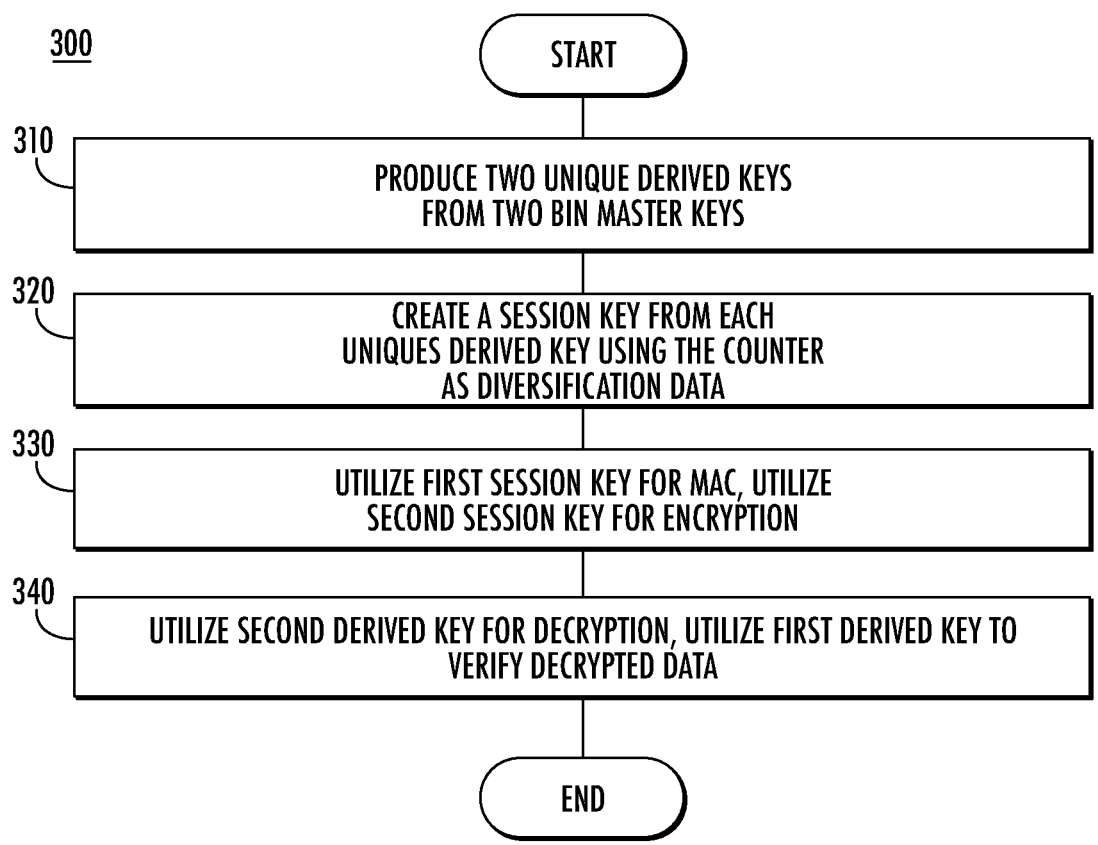
FIG. 3 is a flowchart illustrating key operations according to an example embodiment.

FIG. 3 is a flowchart illustrating key operations 300 according to an example embodiment. As illustrated in FIG. 3, at block 310, two bank identifier number (BIN) level master keys may be used in conjunction with the account identifier and card sequence number to produce two unique derived keys (UDKs) per card. In some examples, a bank identifier number may comprise one number or a combination of one or more numbers, such as an account number or an unpredictable number provided by one or more servers, may be used for session key generation and/or diversification. The UDKs (AUTKEY and ENCKEY) may be stored on the card during the personalization process.

At block 320, the counter may be used as the diversification data, since it changes with each use and provides a different session key each time, as opposed to the master key derivation in which one unique set of keys per card is produced. In some examples, it is preferable to use the 4-byte method for both operations. Accordingly, at block 320, two session keys may be created for each transaction from the UDKs, i.e., one session key from AUTKEY and one session key from ENCKEY. In the card, for the MAC key (i.e., the session key created from AUTKEY), the low order of two bytes of the counter may be used for diversification. For the ENC key (i.e., the session key created from ENCKEY), the full length of the counter may be used for the ENC key.

At block 330, the MAC key may be used for preparing the MAC cryptogram, and the ENC key may be used to encrypt the cryptogram. For example, the MAC session key may be used to prepare the cryptogram, and the result may be encrypted with the ENC key before it is transmitted to the one or more servers.

At block 340, verification and processing of the MAC is simplified because 2-byte diversification may be directly supported in the MAC authentication functions of payment HSMs. Decryption of the cryptogram is performed prior to verification of the MAC. The session keys are independently derived at the one or more servers, resulting in a first session key (the ENC key) and a second session key (the MAC key). The second derived key (i.e., the ENC key) may be used to decrypt the data, and the first derived key (i.e., the MAC key) may be used to verify the decrypted data.

For the contactless card, a different unique identifier is derived which may be related to the application primary account number (PAN) and PAN sequence number, which is encoded in the card. The key diversification may be configured to receive the identifier as input with the master key such that one or more keys may be created for each contactless card. In some examples, these diversified keys may comprise a first key and a second key. The first key may include an authentication master key (Card Cryptogram Generation/Authentication Key—AUTKEY), and may be further diversified to create a MAC session key used when generating and verifying a MAC cryptogram. The second key may comprise an encryption master key (Card Data Encryption Key—ENCKEY), and may be further diversified to create an ENC session key used when encrypting and decrypting enciphered data. In some examples, the first and the second keys may be created by diversifying the issuer master keys by combining them with the card's unique ID number (pUID) and the PAN sequence number (PSN) of a payment applet. The pUID may comprise a 16-digit numerical value. As explained above, pUID may comprise a 16 digit BCD encoded number. In some examples, pUID may comprise a 14-digit numerical value.

In some examples, the session key derivation method will use the low 2 bytes of the counter. In these cases, the generated session key values will wrap after 216 uses. In other examples it may be beneficial to use 4 bytes of the counter in deriving the session key so that the key value generated will not wrap until after 232 uses. As will be obvious to one practiced in the art, different numbers of bits or bytes from the counter can be used as needed to generate session keys which will not wrap in the lifetime of the intended application.

In other examples, such as credit cards, a number, such as a transaction number or an unpredictable number provided by one or more servers, may be used for session key generation and/or diversification.

Figure 4:
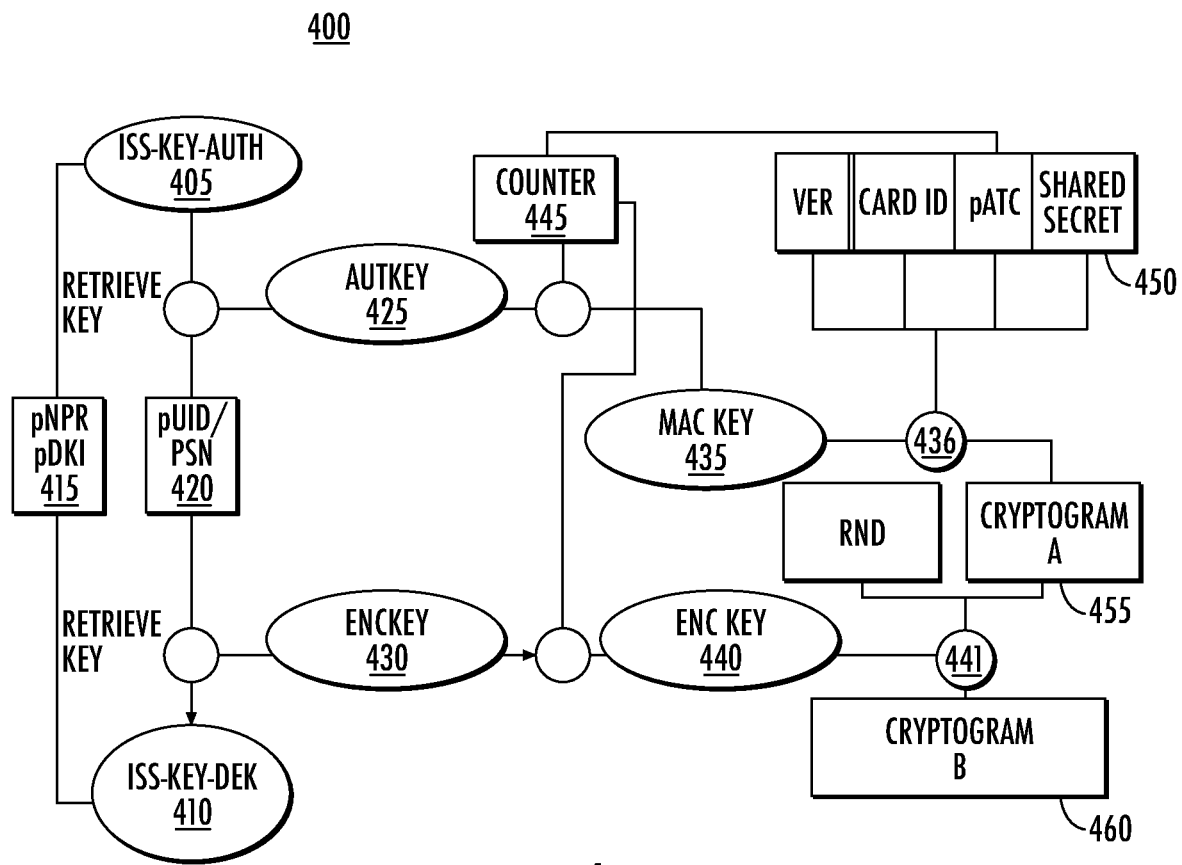
FIG. 4 is a diagram of a key system according to an example embodiment.

FIG. 4 illustrates a diagram of a system 400 configured to implement one or more embodiments of the present disclosure. As explained below, during the contactless card creation process, two cryptographic keys may be assigned uniquely for each card. The cryptographic keys may comprise symmetric keys which may be used to create session keys that are used in encryption and decryption of data, and to create a MAC. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 405, 410 may be required for each part of the portfolio on which the one or more applets is issued. For example, the first master key 405 may comprise an Issuer Cryptogram Generation/Authentication Key (Iss-Key-Auth) and the second master key 410 may comprise an Issuer Data Encryption Key (Iss-Key-DEK). As further explained herein, two issuer master keys 405, 410 are diversified into card master keys 425, 430, which are unique for each card. In some examples, a network profile record ID (pNPR) 415 and derivation key index (pDKI) 420, as back office data, may be used to identify which Issuer Master Keys 405, 410 to use in the cryptographic processes for authentication. The system performing the authentication may be configured to retrieve values of pNPR 415 and pDKI 420 for a contactless card at the time of authentication.

In some examples, to increase the security of the solution, a session key may be derived (such as a unique key per session) but rather than using the card master keys 425, 530 to perform the MAC 436 and encryption 441 operations, the card master keys 425, 430 are used in conjunction with the counter 445 to derive session keys, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (AUTKEY 425 and ENCKEY 430). The session keys (MAC Key 435 and ENC Key 440) may be generated by the one or more applets and derived by using the application transaction counter 445 with one or more algorithms. To fit data into the one or more algorithms, only the 2 low order bytes of the 4-byte counter 445 is used. In some examples, the four byte session key derivation method may comprise: F1:=counter (lower 2 bytes)||'F0'||'00'||PATC (four bytes) F1:=PATC (lower 2 bytes)||'0F'||'00'||counter(four bytes) SK:={(ALG (MK)[F1])||ALG (MK)[F2]}, where ALG may include 3DES ECB and MK may include the card unique derived master key.

As described herein, one or more MAC session keys may be derived using the lower two bytes of counter 445. At each tap of the contactless card, counter 445 is configured to be updated, and the card master keys AUTKEY 425 and ENCKEY 430 are further diversified into the session keys MAC Key 435 and ENC Key 440. Counter 445 may be initialized to zero at personalization or applet initialization time. In some examples, the counter 445 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, the cryptogram 460 will be the result of an encryption 441 which encrypts a random block of data prepended to the output of the MAC operation 436. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (MAC Key) 435. The data specified in cryptogram may be processed with javacard.signature method: ALG_DES_MAC8_ISO9797_1_M2_ALG3 to correlate to EMV ARQC verification methods. The key used for this computation may comprise a session key MAC Key 435, as explained above. As explained above, the low order two bytes of the counter may be used to diversify for the one or more MAC session keys. As explained below, MAC Key 435 may be used to MAC data 450, and the resulting data or cryptogram A 455 and random number RND may be encrypted using ENC Key 440 to create cryptogram B or output 460 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key ENC Key 440 derived from the ENCKEY 430. In this case, the derivation data for the session key derivation is the least significant two bytes of the counter 445.

The format below represents a binary version example embodiment. Further, in some examples, the first byte may be set to ASCII 'A'.

| Message Format | | | | |
|---|---|---|---|---|
| 1 | 2 | 4 | 8 | 8 |
| 0 × 43 (Message Type 'A') | Version 8 bytes | pATC | RND | Cryptogram A (MAC) |
| Cryptogram A (MAC) MAC of | | | | |
| 2 | 8 | 4 | 4 | 18 bytes input data |
| Version | pUID | pATC | Shared Secret | |

| Message Format | | | |
|---|---|---|---|
| 1 | 2 | 4 | 16 |
| 0 × 43 (Message Type 'A') | Version 8 bytes | pATC | Cryptogram B |
| Cryptogram A (MAC) MAC of | | | |
| 2 | 8 | 4 | 4 | 18 bytes input data |
| Version | pUID | pATC | Shared Secret | |
| Cryptogram B Sym Encryption of | 16 | | | |
| 8 | 8 | | | |
| RND | Cryptogram A | | | |

Another exemplary format is shown below. In this example, the tag may be encoded in hexadecimal format.

| Message Format | | | | |
|---|---|---|---|---|
| 2 | 8 | 4 | 8 | 8 |
| Version 8 bytes | pUID | pATC | RND | Cryptogram A (MAC) |
| 8 | 8 | 4 | 4 | 18 bytes input data |
| pUID | pUID | pATC | Shared Secret | |

| Message Format | | | |
|---|---|---|---|
| 2 | 8 | 4 | 16 |
| Version 8 bytes | pUID | pATC | Cryptogram B |
| 8 | | 4 | 4 | 18 bytes input data |
| pUID Cryptogram B Sym Encryption of | pUID 16 | pATC | Shared Secret | |
| 8 | 8 | | | |
| RND | Cryptogram A | | | |

The UID field of the received message may be extracted to derive, from master keys Iss-Key-AUTH 405 and Iss-Key-DEK 410, the card master keys (AUTKEY 425 and ENCKEY 430) for that particular card. Using the card master keys (AUTKEY 425 and ENCKEY 430), the counter field of the received message may be used to derive the session keys (MAC Key 435 and ENC Key 440) for that particular card. Cryptogram B 460 may be decrypted using the ENC Key 440, which yields cryptogram A 455 and RND, and RND may be discarded. The UID field may be used to look up the shared secret of the contactless card which, along with the Ver, UID, and counter fields of the message, may be processed through the cryptographic MAC using the re-created MAC Key 435 to create a MAC output, such as MAC'. If MAC' is the same as cryptogram A 955, then this indicates that the message decryption and MAC checking have all passed. Then the counter may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as MAC Key 435. The input data 450 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter 445 as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the counter 445 may start at zero and be updated by 1 each time the one or more applications generates authentication data. The authentication service may be configured to track the counters 445 used during authentication sessions. In some examples, when the authentication data uses a counter 445 equal to or lower than the previous value received by the authentication service, this may be interpreted as an attempt to replay an old message, and the authenticated may be rejected. In some examples, where the counter 445 is greater than the previous value received, this may be evaluated to determine if it is within an acceptable range or threshold, and if it exceeds or is outside the range or threshold, verification may be deemed to have failed or be unreliable. In the MAC operation 436, data 450 is processed through the MAC using MAC Key 435 to produce MAC output (cryptogram A) 455, which is encrypted.

In order to provide additional protection against brute force attacks exposing the keys on the card, it is desirable that the MAC cryptogram 455 be enciphered. In some examples, data or cryptogram A 455 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise ENC Key 440. In the encryption operation 441, data or cryptogram A 455 and RND are processed using ENC Key 440 to produce encrypted data, cryptogram B 460. The data 455 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and counter 445 to derive the session key used for the cryptogram.

Figure 5:
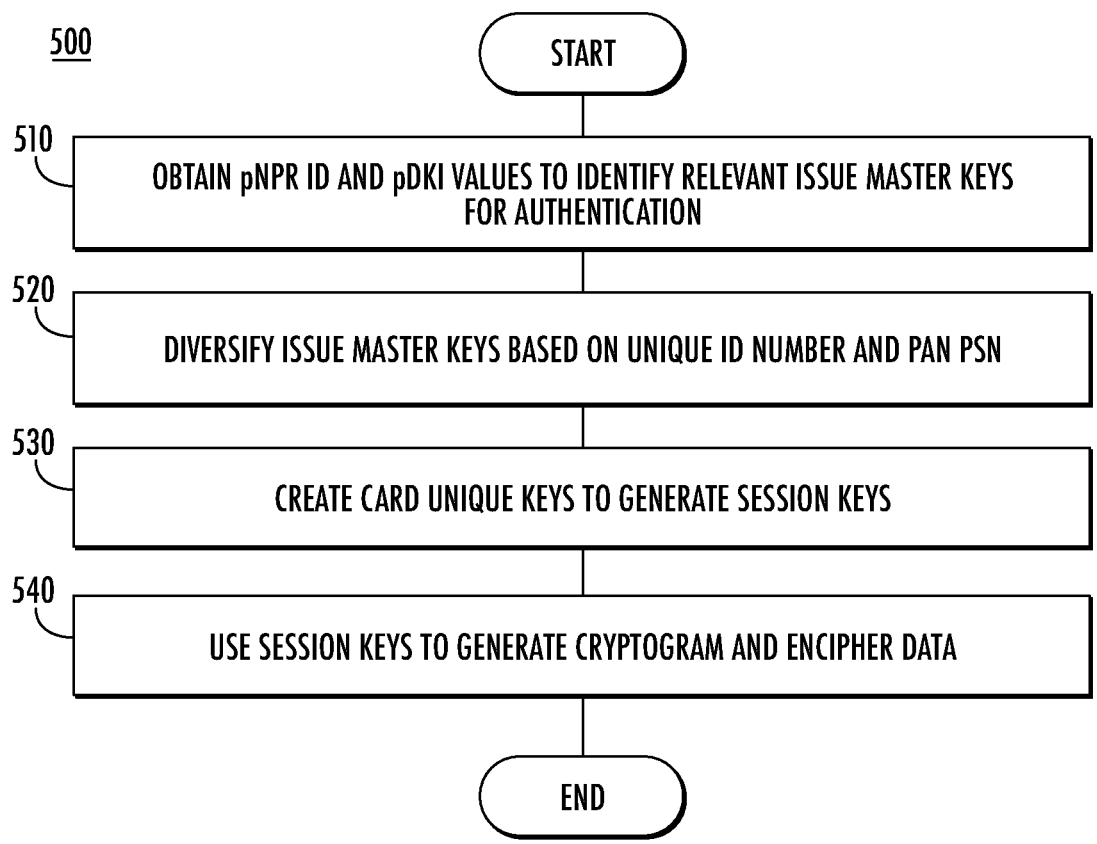
FIG. 5 is a flowchart of a method of generating a cryptogram according to an example embodiment.

FIG. 5 illustrates a method 500 for generating a cryptogram. For example, at block 510, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 520, Issuer Master Keys may be diversified by combining them with the card's unique ID number (pUID) and the PAN sequence number (PSN) of one or more applets, for example, a payment applet.

At block 530, AUTKEY 425 and ENCKEY 430 (unique card keys) may be created by diversifying the Issuer Master Keys to generate session keys which may be used to generate a MAC cryptogram.

At block 540, the keys used to generate the cryptogram and encipher the data in the one or more applets may comprise the session keys of block 530 based on the card unique keys (AUTKEY 425 and ENCKEY 430). In some examples, these session keys may be generated by the one or more applets and derived by using counter 445, resulting in session keys MAC Key 435 and ENC Key 440.

FIG. 6 depicts an exemplary process 600 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 602, and other data, such as data to be protected, which it may securely share with the recipient.

At block 604, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 606, the data to be protected is processed with a cryptographic MAC operation by the sender using the data integrity session key and a cryptographic MAC algorithm. The protected data, including plaintext and shared secret, may be used to produce a MAC using one of the session keys (MAC Key 435).

Block 606 is described in more detail in connection with FIG. 6B. The actions described in connection with FIG. 6B may be performed by the processor 142 on the contact pad 138 of the contactless card 130.

Figure 6B:
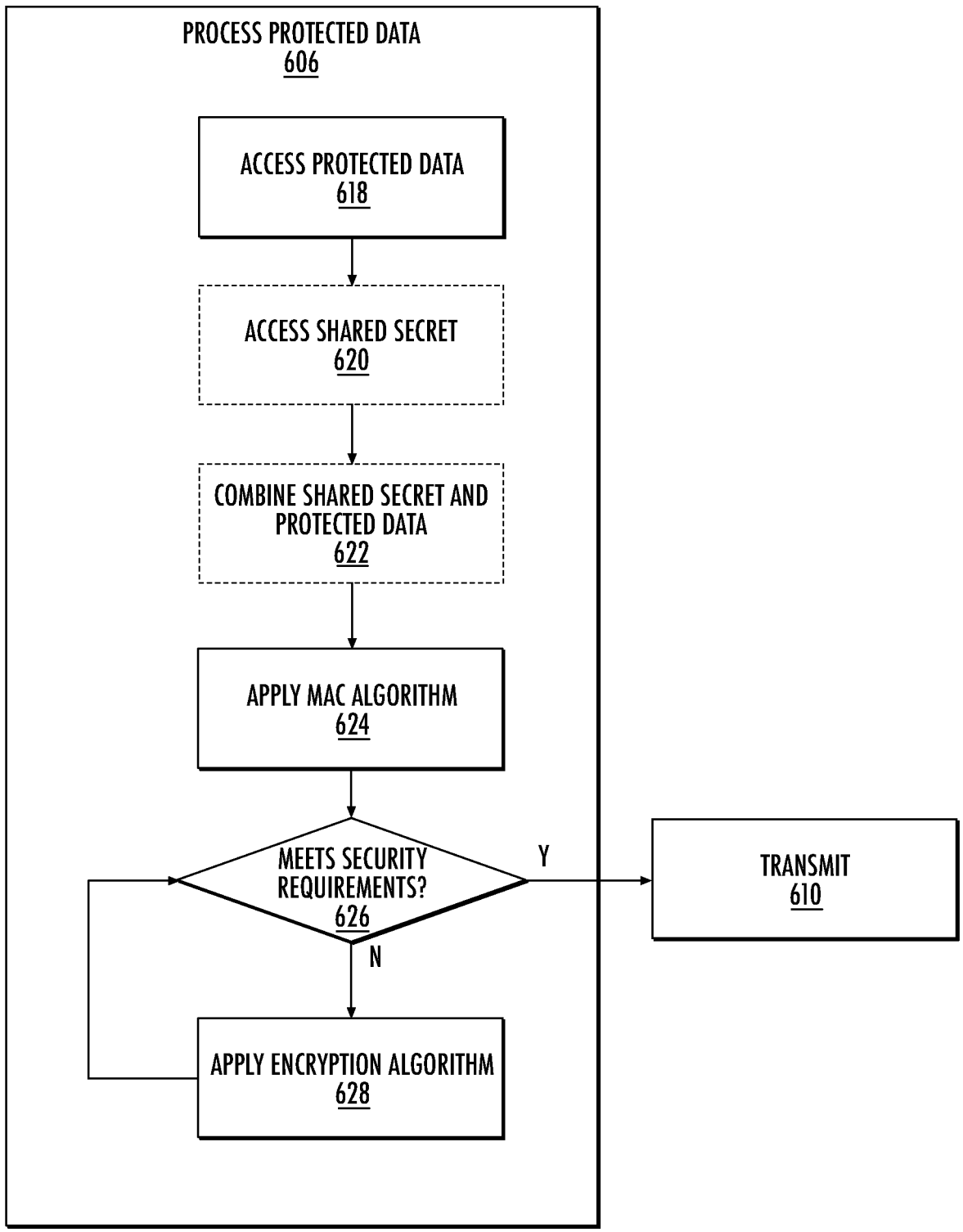
FIG. 6B is a flowchart depicting block 606 of FIG. 6A in more detail.

As shown in FIG. 6B, at block 618 the system may access the protected data, which is used to generate the MAC.

If the protected data is to be combined with a shared secret, then at block 620 the system may optionally access the shared secret (e.g., a random number generated when the contactless card was first initialized, or when a communication session associated with the card was established, and shared between the server and the contactless card). At block 622, the system may combine the shared secret and the protected data, such as by appending the shared secret to the protected data (among other possibilities, such as applying a logical or Boolean operation to the shared secret and protected data).

At block 624, the system may apply a MAC algorithm to the combined data. The MAC algorithm relies on a key in order to generate a MAC, which may be a diversified session key generated using a counter value as described above.

At block 626, the system may determine if the MAC algorithm (optionally applied in conjunction with the shared secret) is sufficiently secure to meet a security requirement of the system. For instance, the system may be provided with a minimum security rating (e.g., expressed in bits), and may determine if the actions taken at blocks 622-624 were sufficient to meet the security rating. In making this determination, the system may add the size of the shared secret (if used) to the security rating of the MAC algorithm (which may be defined by the size of the diversified session key). If the result is greater than the minimum security requirement, then processing may proceed to block 610 and the MAC may be transmitted.

If the result is not greater than the minimum security requirement ("NO" at block 626), then processing may proceed to block 628 and the system may apply an encryption algorithm to the already MAC'ed data using the second diversified session key as described above. Processing may then return to block 626, where the resulting construct is reevaluated to determine if the construct meets the minimum security rating. If so, processing proceeds to block 610 and the (now encrypted) MAC is transmitted. If not, processing may return to block 628 and the system may apply further encryption to the encrypted data to further increase the security of the encrypted data. The system may apply the same encryption algorithm as was previously applied, or may apply a different encryption algorithm. The system may use a different key (e.g., a third diversified session key generated based on a third master key or other data known to both the card and the server). Block 628 may be repeated until a sufficient security rating is reached.

FIG. 6B depicts but one exemplary technique for increasing the security of a cryptographic structure (in this case, a MAC). However, one of ordinary skill in the art will recognize that the depicted blocks may be performed in a different order without diverging from the spirit of the invention. Moreover, some blocks may be eliminated, some blocks may be added, and some depicted blocks may be performed more than once to increase the cryptographic strength of the construct.

It will further be evident that, although exemplary embodiments are described in connection with authenticating messages pertaining to contactless cards, the present invention is not so limited. The concepts described herein, including the augmenting of cryptographic strength for a MAC or encryption algorithm, may be applied in any cryptographic context.

Returning to FIG. 6A, at block 608 the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 610, the encrypted MAC is transmitted, from the sender to the recipient, with sufficient information to identify additional secret information (such as shared secret, master keys, etc.), for verification of the cryptogram.

At block 612, the recipient uses the received counter value to independently derive the two derived session keys from the two master keys as explained above.

At block 614, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 616, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 602) and a new set of session keys may be created (at block 604). In some examples, the combined random data may be discarded.

Example embodiments of systems and methods described herein may be configured to provide security factor authentication. The security factor authentication may comprise a plurality of processes. As part of the security factor authentication, a first process may comprise logging in and validating a user via one or more applications executing on a device. As a second process, the user may, responsive to successful login and validation of the first process via the one or more applications, engage in one or more behaviors associated with one or more contactless cards. In effect, the security factor authentication may include both securely proving identity of the user and engaging in one or more types of behaviors, including but not limited to one or more tap gestures, associated with the contactless card. In some examples, the one or more tap gestures may comprise a tap of the contactless card by the user to a device. In some examples, the device may comprise a mobile device, a kiosk, a terminal, a tablet, or any other device configured to process a received tap gesture.

In some examples, the contactless card may be tapped to a device, such as one or more computer kiosks or terminals, to verify identity so as to receive a transactional item responsive to a purchase, such as a coffee. By using the contactless card, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card and the device, which may configured to process one or more tap gestures. As explained above, the one or more applications may be configured to validate identity of the user and then cause the user to act or respond to it, for example, via one or more tap gestures. In some examples, data for example, bonus points, loyalty points, reward points, healthcare information, etc., may be written back to the contactless card.

In some examples, the contactless card may be tapped to a device, such as a mobile device. As explained above, identity of the user may be verified by the one or more applications which would then grant the user a desired benefit based on verification of the identity.

In some examples, the contactless card may be activated by tapping to a device, such as a mobile device. For example, the contactless card may communicate with an application of the device via a card reader of the device through NFC communication. The communication, in which a tap of the card proximate the card reader of the device may allow the application of the device to read data associated with the contactless card and activate the card. In some examples, the activation may authorize the card to be used to perform other functions, e.g., purchases, access account or restricted information, or other functions. In some examples, the tap may activate or launch the application of the device and then initiate one or more actions or communications with one or more servers to activate the contactless card. If the application is not installed on the device, a tap of the contactless card proximate the card reader may initiate a download of the application, such as navigation to a download page of the application). Subsequent to installation, a tap of the contactless card may activate or launch the application, and then initiate, for example via the application or other back-end communication), activation of the contactless card. After activation, the contactless card may be used in various activities, including without limitation commercial transactions.

In some embodiments, a dedicated application may be configured to execute on a client device to perform the activation of the contactless card. In other embodiments, a webportal, a web-based app, an applet, and/or the like may perform the activation. Activation may be performed on the client device, or the client device may merely act as a go between for the contactless card and an external device (e.g., account server). According to some embodiments, in providing activation, the application may indicate, to the account server, the type of device performing the activation (e.g., personal computer, smartphone, tablet, or point-of-sale (POS) device). Further, the application may output, for transmission, different and/or additional data to the account server depending on the type of device involved. For example, such data may comprise information associated with a merchant, such as merchant type, merchant ID, and information associated with the device type itself, such as POS data and POS ID.

In some embodiments, the example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems.

Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In some examples, the contactless card can selectively communicate information depending upon the recipient device. Once tapped, the contactless card can recognize the device to which the tap is directed, and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the contactless card tap is directed to a device running Apple's iOS® operating system, e.g., an iPhone, iPod, or iPad, the contactless card can recognize the iOS® operating system and transmit data appropriate data to communicate with this device. For example, the contactless card can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card can recognize the POS device and transmit only the information necessary for the action or transaction. For example, upon recognition of a POS device used to complete a commercial transaction, the contactless card can communicate payment information necessary to complete the transaction under the EMV standard.

In some examples, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In some examples the POS device can be affiliated with an authorized merchant or other entity familiar with certain contactless cards or accustomed to performing certain contactless card transactions. However, it is understood such an affiliation is not required for the performance of the described methods.

In some examples, such as a shopping store, grocery store, convenience store, or the like, the contactless card may be tapped to a mobile device without having to open an application, to indicate a desire or intent to utilize one or more of reward points, loyalty points, coupons, offers, or the like to cover one or more purchases. Thus, an intention behind the purchase is provided.

In some examples, the one or more applications may be configured to determine that it was launched via one or more tap gestures of the contactless card, such that a launch occurred at 3:51 pm, that a transaction was processed or took place at 3:56 pm, in order to verify identity of the user.

In some examples, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the contactless card.

In some examples, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In some examples, individuals who have different financial institutions may possess contactless cards to provide information to initiate one or more payment requests from the card-tapping individual.

The following example use cases describe examples of particular implementations of the present disclosure. These are intended solely for explanatory purposes and not for purposes of limitation. In one case, a first friend (payor) owes a second friend (payee) a sum of money. Rather than going to an ATM or requiring exchange through a peer-to-peer application, payor wishes to pay via payee's smartphone (or other device) using a contactless card. Payee logs-on to the appropriate application on his smartphone and selects a payment request option. In response, the application requests authentication via payee's contactless card. For example, the application outputs a display requesting that payee tap his contactless card. Once payee taps his contactless card against the screen of his smartphone with the application enabled, the contactless card is read and verified. Next, the application displays a prompt for payor to tap his contactless card to send payment. After the payor taps his contactless card, the application reads the card information and transmits, via an associated processor, a request for payment to payor's card issuer. The card issuer processes the transaction and sends a status indicator of the transaction to the smartphone. The application then outputs for display the status indicator of the transaction.

In another example case, a credit card customer may receive a new credit card (or debit card, other payment card, or any other card requiring activation) in the mail. Rather than activating the card by calling a provided telephone number associated with the card issuer or visiting a website, the customer may decide to activate the card via an application on his or her device (e.g., a mobile device such as a smartphone). The customer may select the card activation feature from the application's menu that is displayed on a display of the device. The application may prompt the customer to tap his or her credit card against the screen. Upon tapping the credit card against the screen of the device, the application may be configured to communicate with a server, such as a card issuer server which activates the customer's card. The application may then display a message indicating successful activation of the card. The card activation would then be complete.

Figure 7:
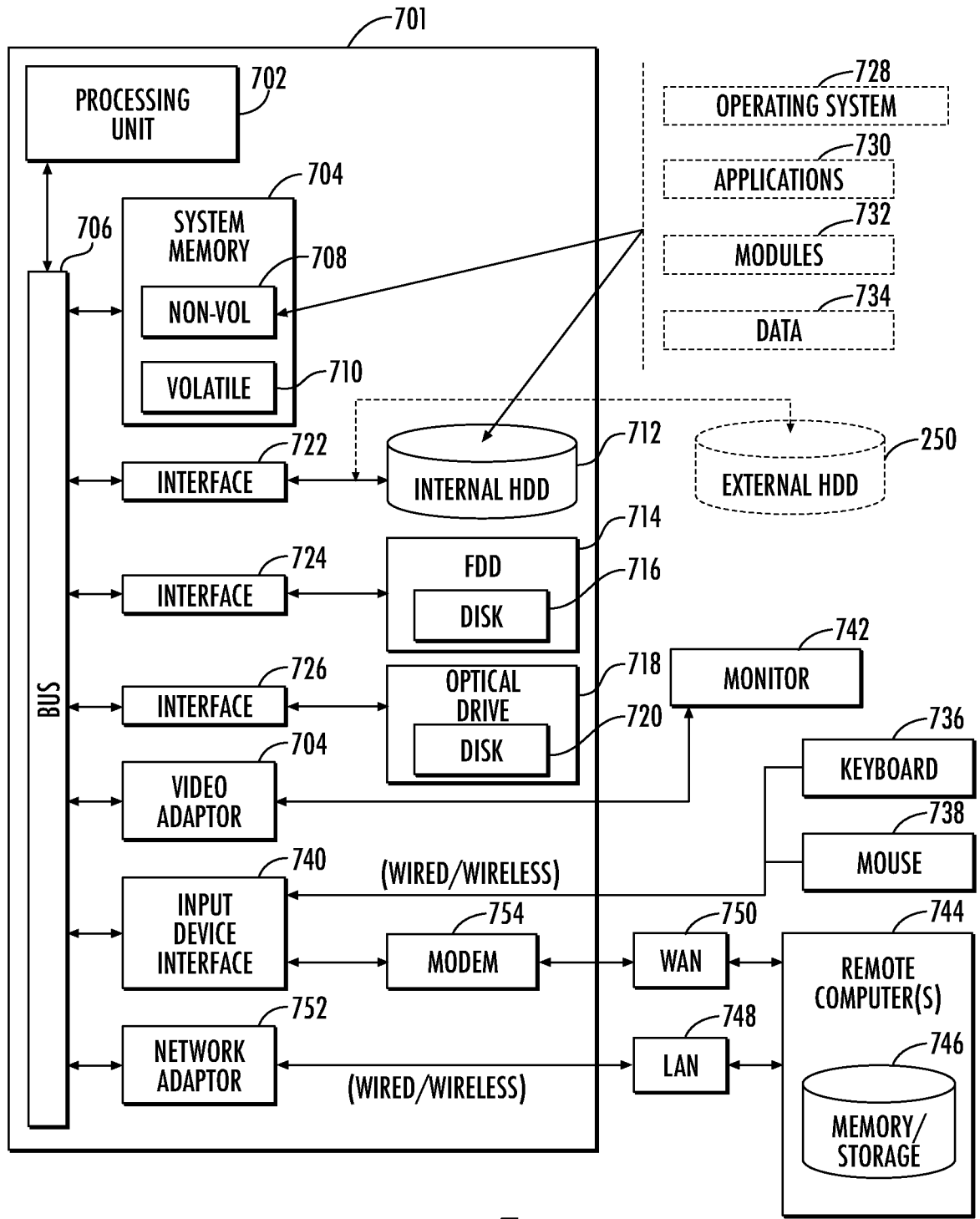
FIG. 7 depicts an exemplary computing system suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
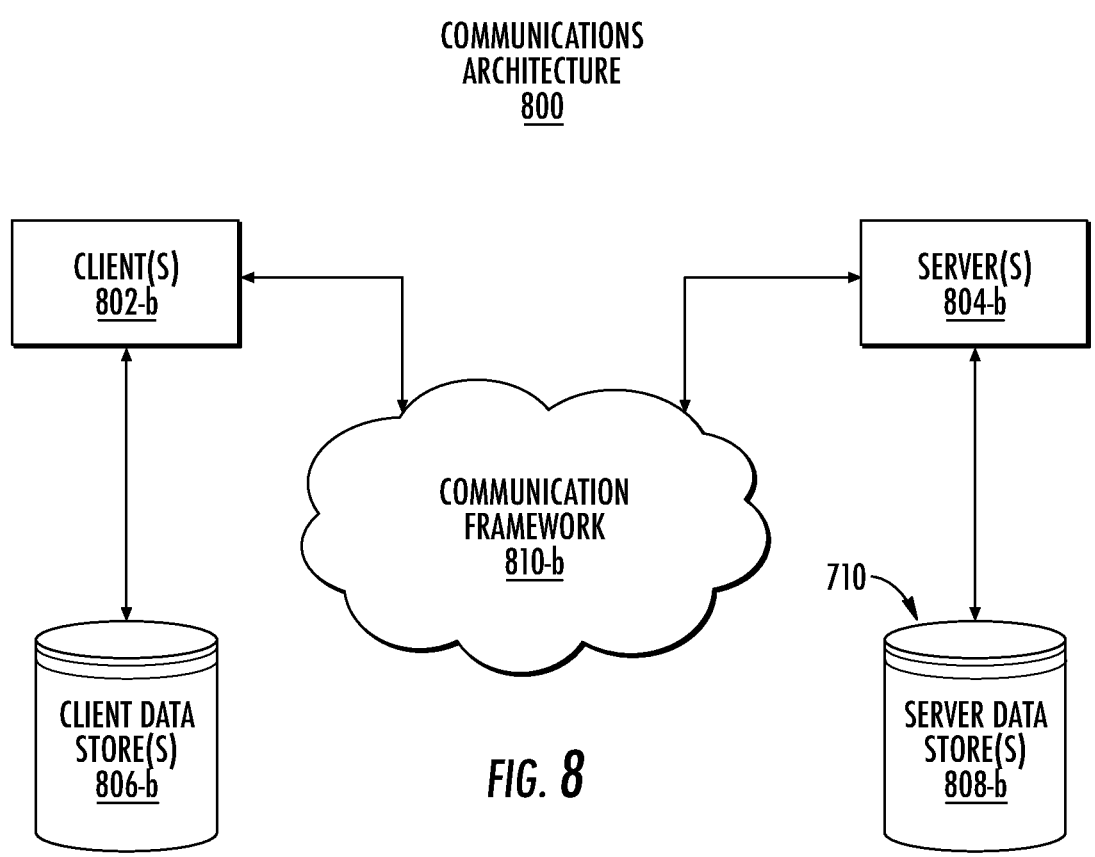
FIG. 8 depicts an exemplary network environment suitable for use with exemplary embodiments.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A non-transitory computer-readable medium storing instructions that, when executed by processing circuitry of a contactless card, cause the processing circuitry to:
   store a shared secret at personalization of the contactless card, the shared secret including a random number shared between the contactless card and a validation server at the personalization of the contactless card;
   determine data to communicate to a recipient;
   access the shared secret stored in memory of the contactless card;
   combine the shared secret and the data;
   generate, using a first key and a counter, a first diversified session key having a first number of bits;
   apply, utilizing the first diversified session key, a message authentication code (MAC) algorithm to the shared secret and the data to generate a MAC output;
   generate, using a second key different from the first key and the counter, a second diversified session key having a second number of bits;
   encrypt the MAC output with an encryption algorithm and the second diversified session key to generate encrypted data; and
   transmit the encrypted data to the recipient.

2. The medium of claim 1, wherein the at least a part of the MAC output is combined with a random element, and the random element is transmitted to the recipient with the encrypted data.

3. The medium of claim 1, wherein the shared secret is not directly sent as part of a transmission of the encrypted data to the recipient.

4. The medium of claim 1, wherein the data is combined with the shared secret by multiplying the shared secret with the data.

5. The medium of claim 1, wherein the data is combined with the shared secret by concatenating the data with at least a portion of the shared secret.

6. The medium of claim 1, wherein the first diversified session key and the second diversified session key are different.

7. The medium of claim 1, wherein utilizing the first diversified session key and the second diversified session key satisfies a security requirement.

8. The medium of claim 7, wherein the security requirement includes a number of operations required to exhaustively search and determine the first diversified session key and the second diversified session key.

9. A computer-implemented method, comprising:
   storing, by a contactless card in a memory, a shared secret at personalization of the contactless card, the shared secret including a random number shared between the contactless card and a validation server at the personalization of the contactless card;
   determining, by the contactless card, data to communicate to a recipient;
   accessing, by the contactless card and from the memory the shared secret stored in the memory of the contactless card;
   combining, by the contactless card, the shared secret and the data;
   generating, by the contactless card using a first key and a counter, a first diversified session key having a first number of bits;
   applying, by the contactless card and utilizing the first diversified session key, a message authentication code (MAC) algorithm to the shared secret and the data to generate a MAC output;

generating, by the contactless card using a second key different than the first key and the counter, a second diversified session key having a second number of bits;

encrypting, by the contactless card, the MAC output with an encryption algorithm and the second diversified session key to generate encrypted data; and sending, by the contactless card via a transceiver, the encrypted data to the recipient.

10. The computer-implemented method of claim 9, wherein the at least a part of the MAC output is combined with a random element, and the random element is transmitted to the recipient with the encrypted data.

11. The computer-implemented method of claim 9, wherein the shared secret is not directly sent with the encrypted data to the recipient.

12. The computer-implemented method of claim 9, wherein the data is combined with the shared secret by multiplying the shared secret with the data.

13. The computer-implemented method of claim 9, wherein the data is combined with the shared secret by concatenating the data with at least a portion of the shared secret.

14. The computer-implemented method of claim 9, wherein the first diversified session key and the second diversified session key are different.

15. The computer-implemented method of claim 9, wherein utilizing the first diversified session key and the second diversified session key satisfies a security requirement.

16. The computer-implemented method of claim 15, wherein the security requirement includes a number of operations required to exhaustively search and determine the first diversified session key and the second diversified session key.

17. A contactless card, comprising:
memory configured to store instructions and a shared secret;
processing circuitry coupled with the memory, the processing circuitry configured to process the instructions, that when executed, cause the processing circuitry to:
store the shared secret in the memory during personalization of the contactless card, the shared secret including a random number;
determine data to communicate to a recipient;
access a shared secret stored in memory of the contactless card;
combine the shared secret and the data;
generate, using a first key and a counter, a first diversified session key having a first number of bits;
apply, utilizing the first diversified session key, a message authentication code (MAC) algorithm to the shared secret and the data to generate a MAC output;
generate, using a second key that is different from the first key and the counter, a second diversified session key having a second number of bits;
encrypt the MAC output with an encryption algorithm and the second diversified session key to generate encrypted data; and
transmit the encrypted data to the recipient.

18. The contactless card of claim 17, wherein the at least a part of the MAC output is combined with a random element, and the random element is transmitted to the recipient with the encrypted data.

19. The contactless card of claim 17, wherein utilizing the first diversified session key and the second diversified session key satisfies a security requirement.

20. The contactless card of claim 19, wherein the security requirement includes a number of operations required to exhaustively search and determine the first diversified session key and the second diversified session key.

* * * * *